United States Patent
Jain et al.

(10) Patent No.: US 11,009,995 B2
(45) Date of Patent: May 18, 2021

(54) SELF-DIAGNOSTIC METHODS FOR REFINING USER INTERFACE OPERATIONS

(71) Applicant: QUALCOMM Incorporated, San Diego, CA (US)

(72) Inventors: Shantanu Jain, Gwalior (IN); Aditya Parulkar, Hyderabad (IN); Salman Mohammad, Hyderabad (IN); Vevek Venkatesan, Tiruvannnamalai (IN); Aditya Prakash, Lucknow (IN); Jonathan Kies, Encinitas, CA (US); Douglas Brems, San Diego, CA (US); Robyn Teresa Oliver, Highland Park, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/654,681

(22) Filed: Oct. 16, 2019

(65) Prior Publication Data

US 2021/0117038 A1    Apr. 22, 2021

(51) Int. Cl.
*G06F 3/041* (2006.01)
*G06F 3/044* (2006.01)
*G06F 9/451* (2018.01)

(52) U.S. Cl.
CPC ............ *G06F 3/0418* (2013.01); *G06F 3/044* (2013.01); *G06F 9/451* (2018.02)

(58) Field of Classification Search
CPC ......... G06F 3/0418; G06F 3/044; G06F 9/451
USPC ......... 345/174, 173, 178; 324/300; 714/38.1
See application file for complete search history.

(56) References Cited

U.S. PATENT DOCUMENTS

| | | | |
|---|---|---|---|
| 8,190,785 B2* | 5/2012 | Hill ...................... | G06F 9/4413 710/8 |
| 8,519,722 B1* | 8/2013 | Prendergast .......... | G06F 3/0418 324/658 |
| 2008/0278453 A1* | 11/2008 | Reynolds ............. | H03K 17/962 345/173 |
| 2009/0160821 A1* | 6/2009 | Han ...................... | A61B 8/467 345/174 |
| 2010/0302212 A1* | 12/2010 | Weber ................... | G06F 3/0488 345/178 |
| 2015/0097784 A1* | 4/2015 | Lee ........................ | G06F 1/1643 345/173 |
| 2015/0286338 A1* | 10/2015 | Zhang ................... | G06F 3/0488 345/178 |
| 2015/0347891 A1* | 12/2015 | Foo ....................... | G07F 7/0806 235/492 |
| 2016/0026561 A1* | 1/2016 | Schur ................... | G06F 11/3672 714/38.1 |
| 2016/0147370 A1* | 5/2016 | Mohindra ............... | G06F 3/047 345/174 |

(Continued)

*Primary Examiner* — Prabodh M Dharia
(74) *Attorney, Agent, or Firm* — The Marbury Law Group, PLLC

(57) ABSTRACT

Various embodiments include methods and devices for implementing refining of user interface (UI) behavior. Embodiments may include creating a touch-profile of a touch-panel of a computing device from results of a self-diagnostic test measuring capacitance of capacitive sensors of the touch-panel, embedding the touch-profile in a framework of an operating system of the computing device, determining an unusable area of the touch-panel from the touch-profile, and determining a UI modification based on the unusable area of the touch-panel.

30 Claims, 22 Drawing Sheets

(56) References Cited

U.S. PATENT DOCUMENTS

2016/0320913 A1* 11/2016 Gao .................... G06F 3/04166
2016/0327925 A1* 11/2016 Leonelli ............. G05B 19/0426

* cited by examiner

SELF-DIAGNOSTIC METHODS FOR REFINING USER INTERFACE OPERATIONS

BACKGROUND

User interactions with mobile devices, such as smartphones, increasingly rely on touch-sensitive touchscreens displays rather than physical controls, such as buttons, switches, dials, etc. However, touchscreen displays are delicate, and damage to and wear out of touchscreen components can adversely affect a user's ability to interact with a mobile device.

SUMMARY

Various aspects may include computing devices and methods for refining user interface (UI) behavior of a touch-panel of a computing device. Various aspects may include performed by a processor of a computing device creating a touch-profile of a touch-panel of the computing device from results of a self-diagnostic test measuring capacitance of capacitive sensors of the touch-panel, embedding the touch-profile in a framework of an operating system of the computing device, determining a UI modification based on the touch-profile, and implementing the UI modification.

Some aspects may include determining whether the touch-panel is healthy from the touch-profile. In such aspects, determining a UI modification based on the touch-profile may include determining the UI modification based on the touch-profile in response to determining that the touch-panel is not healthy.

Some aspects may include notifying an operating system or an application executing on the computing device that the touch-panel is not healthy in response to determining that the touch-panel is not healthy. In such aspects, determining the UI modification based on the touch-profile may include determining the UI modification based on the touch-profile for a UI of the operating system by the operating system or for a UI of the application by the application in response to being notified that the touch-panel is not healthy.

Some aspects may include determining whether the touch-panel is functional from the from the touch-profile. In such aspects, determining a UI modification based on the touch-profile may include determining the UI modification of remapping interaction with the UI to an input device of the computing device other than the touch-panel in response to determining that the touch-panel is not functional.

Some aspects may include notifying an operating system or an application executing on the computing device that the touch-panel is not functional in response to determining that the touch-panel is not functional. In such aspects, determining the UI modification of remapping interaction with the UI to an input device of the computing device other than the touch-panel may include determining the UI modification of remapping interaction with the UI to the input device of the computing device other than the touch-panel for a UI of the operating system by the operating system or for a UI of the application by the application in response to being notified that the touch-panel is not functional.

In some aspects, determining a UI modification based on the touch-profile may include determining the UI modification that maps an area of the UI overlapping with an unhealthy area of the touch-panel to a healthy area of the touch-panel.

In some aspects, determining a UI modification based on the touch-profile may include determining the UI modification that maps at least part of an element of the UI overlapping with an unhealthy area of the touch-panel to a healthy area of the touch-panel.

In some aspects, determining a UI modification based on the touch-profile may include determining the UI modification that interprets a user interaction with the touch-panel across an unhealthy area of the touch-panel based on a user interaction with the touch-panel outside of the unhealthy area of the touch-panel.

Further aspects include a computing device including a touchscreen display and a processor configured with processor-executable instructions to perform operations of any of the methods summarized above. Further aspects include a non-transitory processor-readable storage medium having stored thereon processor-executable software instructions configured to cause a processor of a computing device to perform operations of any of the methods summarized above. Further aspects include a processing device for use in a computing device and configured to perform operations of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
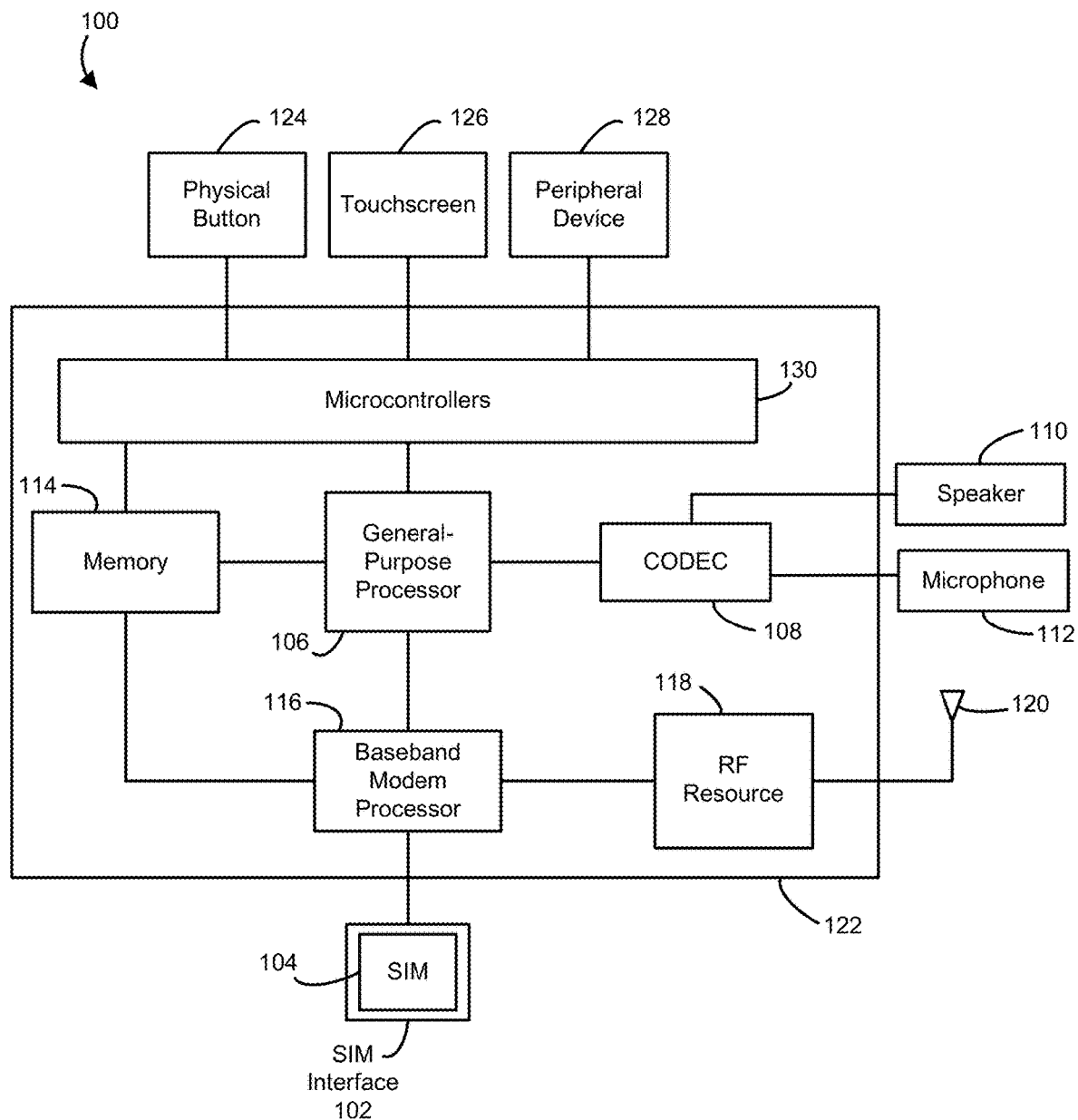
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments may include methods, and computing devices implementing such methods for touch-panel self-diagnostic testing and refining user interface (UI) behavior. In some embodiments, a computing device having a touch-panel may schedule, execute, and store results of a self-diagnostic test of the touch-panel. In some embodiments, the computing device may implement a refinement of the UI behavior to mitigate the effects of damage to the touch-panel. In some embodiments, the computing device may determine the refinement of the UI behavior from the results of the self-diagnostic test of the touch-panel. In some embodiments, a refinement of the UI behavior may differ for a graphical user interface (GUI) of an operating system (OS) and/or various applications (sometimes referred to herein as "apps") on the computing device. In some embodiments, determination of the refinement of the UI behavior may depend on the GUI and/or application running on the computing device. In some embodiments, the computing device, the OS, and/or the application may be configured to determine the refinement of the UI behavior from the results of the self-diagnostic test of the touch-panel and the GUI and/or application running on the computing device.

Various embodiments may be used in a variety of computing devices, but may be particularly useful in mobile devices that have touchscreen UIs. The term "computing device" is used herein to refer to any of a variety of computing devices including smartphones, mobile computing devices (e.g., tablets, laptops, wearable devices, etc.), Internet of Things ("IoT") devices, enhanced machine-type communication (eMTC) devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

Touchscreen equipped computing devices are increasingly pervasive and indispensable to users. Such users depend on the reliability of the touchscreen to interact with the computing devices. However, touchscreens, including components such as an insulating layer frequently made of glass and capacitive touch-panels having multiple capacitive sensors, are subject to damage that can adversely affect a user's ability to interact with the computing device. Such effects can include inaccurate and/or no responses to user inputs via the touchscreen. The damage can be caused by forceful impacts to the touchscreen, liquid contacting electrical components of the touchscreen, repeated use of the touchscreen, particularly when the repeated use is of an area of the touchscreen that receives more use than other areas of the touchscreen, and faulty components of the touchscreen. In such instances, all or portions of a touchscreen can be subject to damage.

Various embodiments may include detection of damage to the touchscreen and refinement of the UI behavior for user interaction with the damaged touchscreen. In some embodiments, the computing device having the damaged touchscreen may schedule and execute a self-diagnostic test of the touch-panel. The computing device may generate a touch-profile for the touch-panel from the results of the self-diagnostic test that may indicate a health of the touch-panel. The touch-profile may indicate whether the touch-panel is healthy, unhealthy, for example, including an indication of location and/or size of unhealthy portions of the touch-panel and/or a health score for the entire touch-panel. In some embodiments, the touch-panel may be so unhealthy that the touch-profile may indicate that the touch-panel is non-functional. The computing device may store the touch-profile in a manner that embeds the touch-profile into the OS framework, making the touch-profile available to the OS and various applications executing on the computing device.

In some embodiments, the OS, the applications, and/or the computing device may refine behaviors of a UI to mitigate the effects of the damage to the touchscreen. An analysis of the touch-profile may indicate which areas of the touchscreen are healthy and which areas are unhealthy. The UI behavior may be refined such that a user is presented with a modified UI, via the touchscreen, that may be configured to use healthy areas of the touchscreen and avoid unhealthy areas of the touchscreen. In some embodiments, the damage to the touchscreen may be so extensive that modifying the behavior of the UI may include using user inputs via input devices other than the touchscreen. In some embodiments, the OS, the applications, and/or the computing device may implement machine learning trained models to determine the modification to the UI behavior.

FIG. 1 illustrates components of a computing device 100 that is suitable for implementing the various embodiments. The various embodiments described herein may be implemented in a computing device 100 that operates within a variety of communication systems, such as any number of mobile networks, such as mobile telephony networks. In various embodiments, a computing device 100 may support any number of subscriptions to mobile telephony networks. To support subscriptions to multiple mobile telephony networks, in some embodiments the computing device 100 may be a multi-SIM communication device.

A computing device 100 may communicate with a mobile telephony network via a cellular connection to a base station of the mobile telephony network. The cellular connection may be made through two-way wireless communication links using a variety of communication technologies, such as Long Term Evolution (LTE), fifth generation (5G), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS); WPANs, such as Wireless USB, Bluetooth, and ZigBee; and/or near-field communication.

A computing device 100 may include any number of subscriber identity modules (SIM) interfaces which may receive an identity module. The computing device 100 may include a subscriber identity module (SIM) interface 102, which may receive an identity module SIM 104 that is associated with a subscription to a mobile telephony network. In various embodiments, the computing device 100 may be a multi-subscription computing device including a second (or more) SIM interface (not shown), which may receive a second identity module SIM (not shown) that is associated with a second subscription to a second mobile telephony network.

A SIM 104 in the various embodiments may be a Universal Integrated Circuit Card (UICC) that is configured with SIM and/or Universal SIM (USIM) applications, enabling access to, for example, GSM, and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 104 may have a central processor unit (CPU), read only memory (ROM), random access memory (RAM), electrically erasable programmable read only memory (EEPROM), and input/output (I/O) circuits. A SIM used in the various embodiments may contain user account information, an international mobile subscriber identity (IMSI), a set of SIM method application toolkit (SAT) commands, and storage space for phone book contacts. A SIM may further store a mobile country code (MCC), mobile network code (MNC), and a Home Public-Land-Mobile-Network (HPLMN) code to indicate the SIM card network operator provider. An Integrated Circuit Card Identity (ICCID) SIM serial number may be printed on the SIM for identification.

Each computing device 100 may include at least one controller, such as a general purpose processor 106 (e.g., a central processing unit (CPU)), which may be coupled to a coder/decoder (CODEC) 108. The CODEC 108 may be coupled to a speaker 110 and a microphone 112. The general purpose processor 106 may also be coupled to at least one memory 114. The memory 114 may be a non-transitory tangible computer readable storage medium that stores processor-executable instructions. For example, the instructions may include routing communication data relating to a subscription through a corresponding baseband-radio frequency (RF) resource chain, or RF chain. The memory 114 may store operating system (OS) software, as well as user application software and executable instructions, including instructions configured to cause a processor to perform operations of various embodiments.

The general purpose processor 106 and memory 114 may each be coupled to at least one baseband modem processor 116. In various embodiments the SIM 104 in the computing device 100 may be associated with a baseband-RF resource chain. In various embodiments, multiple SIMs 104 may be associated with a common baseband-RF resource chain shared by two or more SIMs 104, or a SIM 104 may be associated with a dedicated baseband-RF resource chain. Each baseband-RF resource chain may include the baseband modem processor 116 to perform baseband/modem functions for communications on a SIM 104, and one or more amplifiers and radios, referred to generally herein as RF resource 118. In some embodiments, baseband-RF resource chains may interact with a shared baseband modem processor 116 (i.e., a single device that performs baseband/modem functions for all SIMs 104 on the computing device). Alternatively, each baseband-RF resource chain may include physically or logically separate baseband processors.

In some embodiments, the baseband modem processor 116 may be an integrated chip capable of managing the protocol stacks of the SIMs 104 or subscriptions and implementing a co-existence manager software. By implementing modem software, subscription protocol stacks, and the co-existence manager software on this integrated baseband modem processor 116, thread based instructions may be used on the integrated baseband modem processor 116 to communicate instructions between the software implementing interference mitigation techniques for co-existence issues, and the receive (Rx) and transmit (Tx) operations.

The RF resource 118 may be communication circuits or transceivers that perform transmit/receive functions for the associated SIM 104 of the computing device 100. The RF resource 118 may be communication circuits that include separate transmit and receive circuitry, or may include a transceiver that combines transmitter and receiver functions. The RF resource 118 may be configured to support multiple radio access technologies/wireless networks that operate according to different wireless communication protocols.

The RF resource 118 may include or provide connections to different sets of amplifiers, digital to analog converters, analog to digital converters, filters, voltage controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth, near-field communication, and/or the like). The RF resources 118 may also be coupled to the baseband modem processor 116.

In some embodiments, the general purpose processor 106, memory 114, baseband processor(s) 116, and RF resource 118 may be included in the computing device 100 as a system-on-chip (SoC) 122. In other embodiments, the SIM 104 and its corresponding interfaces 102 may be external to the system-on-chip 122. Further, various peripheral devices, that may function as input and output devices, may be coupled to components on the system-on-chip 122, such as interfaces or controllers/microcontrollers 106, 108, 116, 118, 130. Example user peripheral device suitable for use in the computing device 100 may include, but are not limited to, the speaker 110, the microphone 112, the antenna 120, a physical button 124, a touchscreen 126, and other peripheral devices 128, such as a camera, an accelerometer, a gyroscope, a biometric sensor, etc. In some embodiments the touchscreen 126, may include a capacitive touch-panel, a display unit, such as a liquid crystal display (LCD), a light emitting diode (LED) display, an organic light emitting diode (OLED) display, etc., and an insulating layer, such as a glass or plastic layer.

In some embodiments, the computing device 100 may be a single-technology or multiple-technology device having more or less than two RF chains. Further, various embodiments may be implemented in single RF chain or multiple RF chain computing devices with fewer SIM cards than the number of RF chains, including devices that do not use any physical SIM cards relying instead on virtual SIM applications. In various embodiments, the computing device 100 having a common baseband-RF resource chain may be capable of operating in a single radio LTE mode to allow multiple radio access technologies to share the common baseband-RF resource chain.

Figure 2:
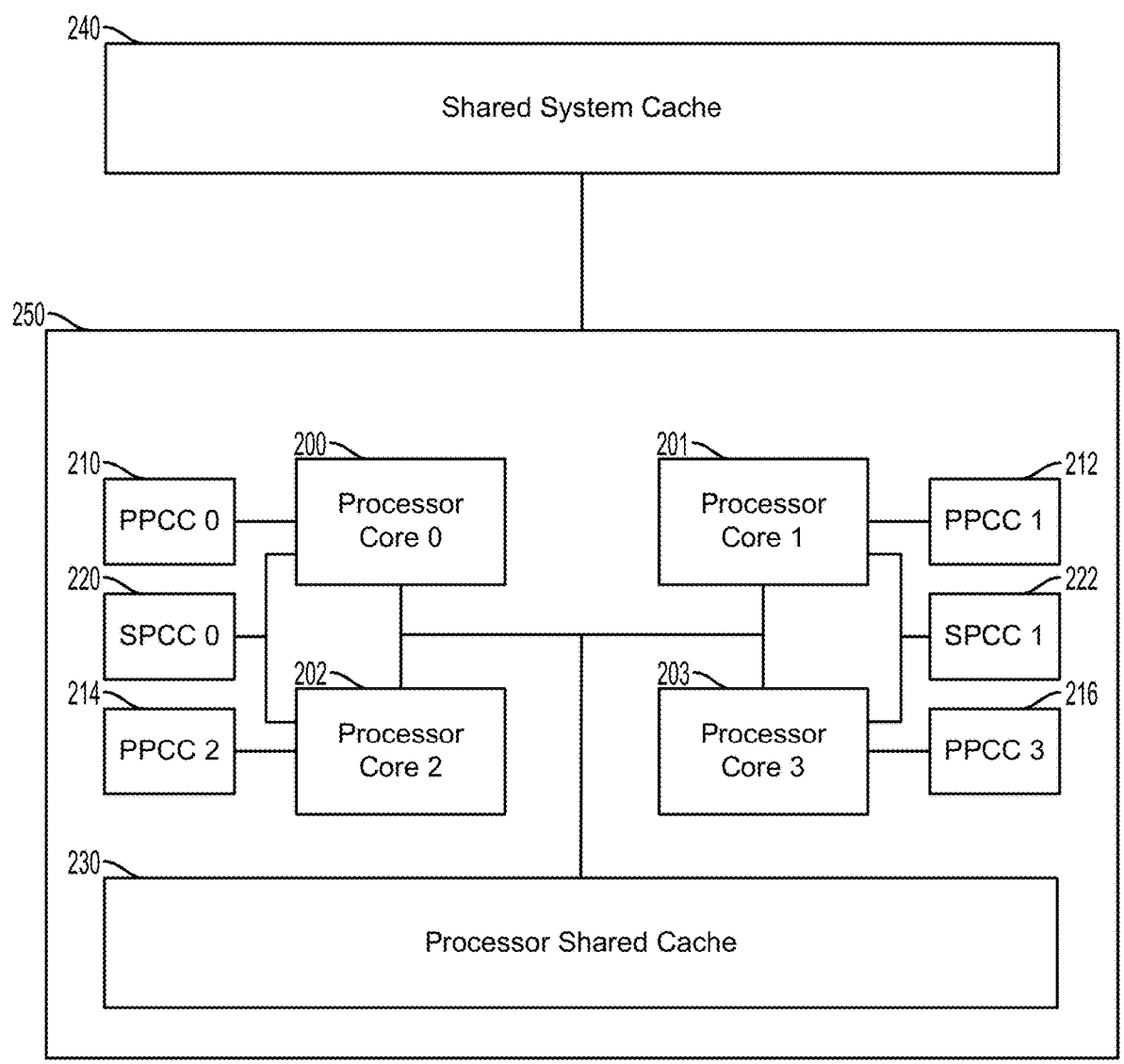
FIG. 2 is a component block diagram illustrating an example multicore processor suitable for implementing various embodiments.

FIG. 2 illustrates components of a computing device (e.g., computing device 100 in FIG. 1) suitable for implementing an embodiment. With reference to FIG. 1, a processor 250 (e.g., general purpose processor 106, baseband modem processor 116, controllers/microcontrollers 108, 118, 130) may include multiple processor types, including, for example, a CPU and various hardware accelerators, such as a graphics processing unit (GPU), a digital signal processor (DSP), an application processing unit (APU), a peripheral device processor, controllers/microcontrollers, etc. The processor 250 may also include a custom hardware accelerator, which may include custom processing hardware and/or general purpose hardware configured to implement a specialized set of functions. The processors 250 may include any number of processor cores 200, 201, 202, 203. A processor 250 having multiple processor cores 200, 201, 202, 203 may be referred to as a multicore processor.

The processor 250 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 250 may be configured for the same purpose and have the same or similar performance characteristics. For example, the processor 250 may be a general purpose processor, and the processor cores 200, 201, 202, 203 may be homogeneous general purpose processor cores. The processor 250 may be a GPU or a DSP, and the processor cores 200, 201, 202, 203 may be homogeneous graphics processor cores or digital signal processor cores, respectively. The processor 250 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 250 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 122 of FIG. 1) may include any number of homogeneous or heterogeneous processors 250. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 250 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203. The private processor core cache 210, 212, 214, 216 may include volatile memory.

Groups of the processor cores 200, 201, 202, 203 of a processor 250 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated, for use in execution by the processor cores 200, 201, 202, 203 in the designated group. The shared processor core cache 220, 222 may include volatile memory.

The processor 250 may include a shared processor cache memory 230 that may be dedicated for read and/or write access by the processor cores 200, 201, 202, 203 of the processor 250. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 250. The shared cache 230 may include volatile memory.

Multiple processors 250 may access a shared system cache memory 240 (e.g., memory 114 in FIG. 1) that may be dedicated for read and/or write access by the processor cores 200, 201, 202, 203 of the multiple processors 250. The shared system cache 240 may store data and/or instructions and make the stored data and/or instructions available to the processor cores 200, 201, 202, 203, for use in execution by the processor cores 200, 201, 202, 203. The shared system cache 240 may also function as a buffer for data and/or instructions input to and/or output from the multiple processors 250. The shared system cache 240 may include volatile memory.

In the example illustrated in FIG. 2, the processor 250 includes four processor cores 200, 201, 202, 203 (i.e., processor core 0, processor core 1, processor core 2, and processor core 3). In the example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1). For ease of explanation, the examples herein may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The computing device 100, the SoC 122, or the processor 250 may individually or in combination include fewer or more than the four processor cores 200, 201, 202, 203 and private processor core caches 210, 212, 214, 216, and two shared processor core caches 220, 222 illustrated and described herein.

For ease of reference, the terms "hardware accelerator," "custom hardware accelerator," "multicore processor," "processor," "processor core," "controller," and "microcontroller" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers and may be located and connected differently within the SoC or separate from the SoC.

Various embodiments are described with reference to FIGS. 3-22 refer to example hardware components described with reference to FIGS. 1 and 2. The following references to combinations of hardware components are not intended to be limiting regarding the number or types of processors, hardware accelerators, controllers, and/or memories that may be included as hardware components for implementing the various embodiments described herein. Various embodiments may be implemented using any combination of components.

Figure 3:
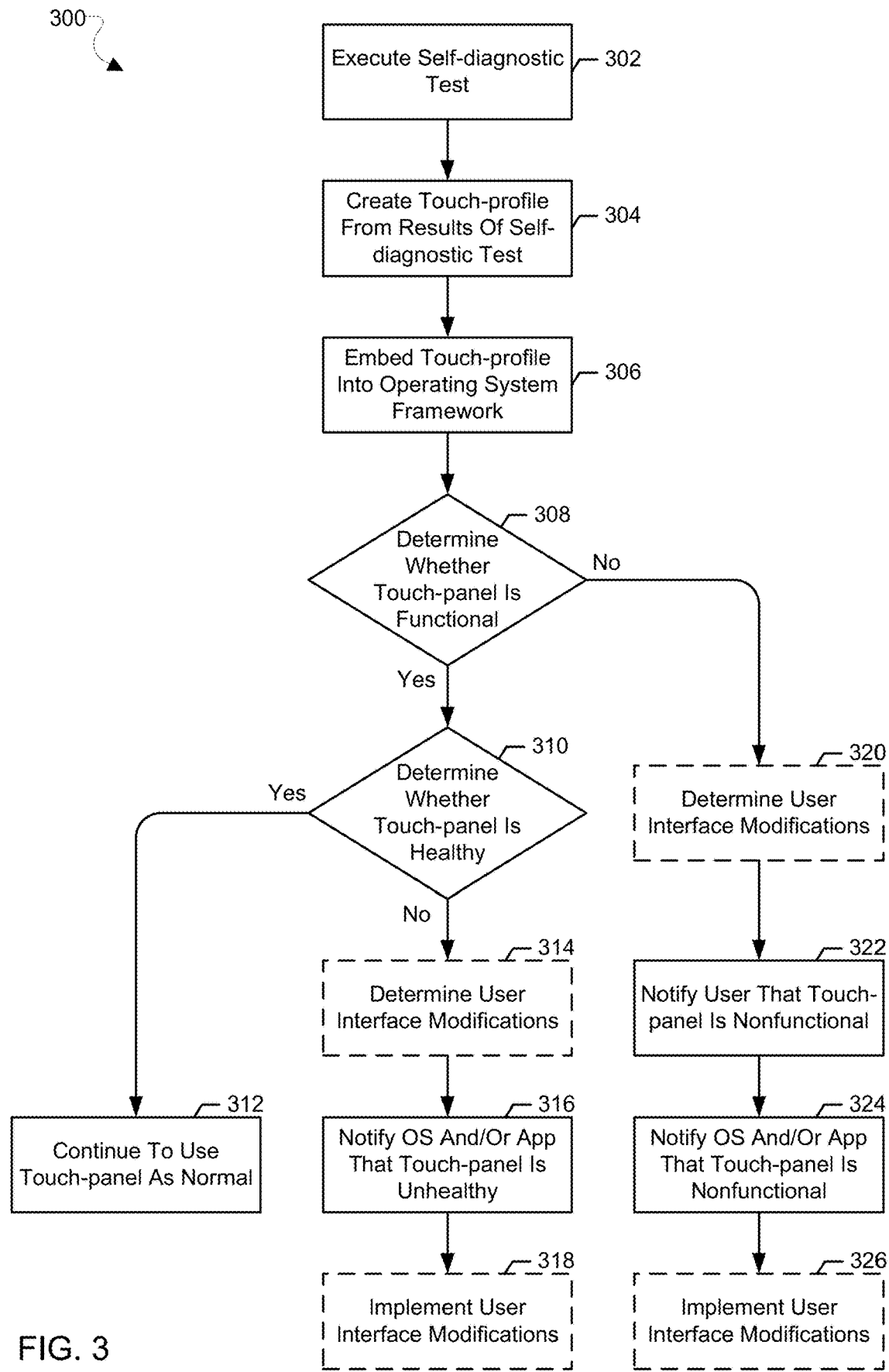
FIG. 3 is a process flow diagram illustrating a method for touch-panel self-diagnostic testing and refining user interface (UI) behavior according to various embodiments.

FIG. 3 illustrates a method 300 for touch-panel self-diagnostic testing and refining UI behavior according to various embodiments. The method 300 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a computing device touch-panel self-diagnostic testing and UI behavior refining system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 300 is referred to herein as a "processing device."

In block 302, the processing device may execute a self-diagnostic test of a touch-panel. In some embodiments, the self-diagnostic test may include applying a current to each capacitive sensor of the touch-panel and recording the measured capacitance by the capacitive sensor. In some embodiments, the processing device may schedule the self-diagnostic test to execute. The self-diagnostic test may be scheduled to execute periodically based on time and/or an amount of use of the touch-panel; in response to a sensed damage event, such as a sudden deceleration measured by an accelerometer of a computing device, for example, resulting from the computing device falling to a hard surface; as part of a startup and/or shutdown procedure of the computing device; as part of a larger self-diagnostic test of the computing device; and/or in response to a user input to execute the self-diagnostic test.

In block 304, the processing device may create a touch-profile of the self-diagnostic test of the touch-panel. The touch-profile may indicate a degree of health of pixels of a display unit of a touchscreen (e.g., touchscreen 126 in FIG. 1). For example, the touch-profile may indicate which pixels are unhealthy and/or a degree to which the pixels are unhealthy. It may not be necessary to indicate which pixels are healthy as this may be determined by extrapolating which pixels are not included in the touch-profile. Similarly, the touch-profile may indicate which pixels are healthy and/or a degree to which the pixels are healthy. The touch-profile indicating the healthy pixels may omit the unhealthy pixels. In some embodiments, the touch-profile may indicate which pixels are unhealthy and which pixels are healthy and/or a degree to which the pixels are unhealthy and/or healthy.

The processing device may associate the results of the self-diagnostic test for a certain capacitive sensor with any number of pixels of a display unit of a touchscreen, which may correlate to a location of the pixels on the touchscreen to the touch-panel. For example, the pixels may be arranged in a two dimensional coordinate plane, and the results of the self-diagnostic test for the certain capacitive sensor of the touch-panel may be associated with the coordinates of a pixel. In some embodiments, the touch-profile may indicate a degree of health of a pixel. Due to the special relationship of the pixels to locations on the touch-panel, the degree of health of a pixel may be correlated to and/or interchangeable with a degree of health of a location on the touch-panel.

The degree of health may be indicated by a value of the measured capacitance of the associated capacitive sensor and/or by a representation of the measured capacitance of the associated capacitive sensor. The representation of the measured capacitance may be determined by comparing the measured capacitance to any number of pixel health thresholds. For example, the measured capacitance may be compared to a binary pixel health threshold for which the comparison may indicate that the pixel is unhealthy in response to the measured capacitance not exceeding the binary pixel health threshold and healthy in response to the measured capacitance exceeding the binary pixel health threshold. The measured capacitance may be compared to multiple stepped pixel health thresholds for which the comparison may indicate that the pixel is of a degree of health in response to the measured capacitance not exceeding a first stepped pixel health threshold and exceeding a second stepped pixel health threshold. Further, at the ends of a spectrum of designated health statuses, the measured capacitance may be compared to a stepped pixel health threshold for which the comparison may indicate that the pixel is of a degree of health at a first end of the spectrum in response to the measured capacitance not exceeding a third stepped pixel health threshold and a degree of health at a second end of the spectrum in response to the measured capacitance exceeding a fourth stepped health threshold. In some embodiments, the degree of health may be represented by values in any format, such as bits, characters, percentages, values on a scale, etc.

In some embodiments, the processing device may analyze the results of the self-diagnostic test for the touch-panel and determine a degree of health of areas of the touch-panel. The processing device may analyze the results to determine an area of concentration of pixels of various degrees of health, which may include a size of the area on the touch-panel. For example, the area may be at least a minimum size for the computing device to register a user input via the touch-panel of the touchscreen. Areas of the touch-panel may not be mutually exclusive and, therefore, may overlap. Areas of the touch-panel may include portions and/or all of the touch-panel.

In some embodiments, the touch-profile may indicate a degree of health of an area of the touch-panel. The degree of health may be indicated by a value calculated using the measured capacitance of the capacitive sensors associated with the pixels of the area of the touch-panel and/or by a representation of the measured capacitance of the associated capacitive sensors, such as the degree of health of the pixels. The degree of health of an area of the touch-panel may be determined by comparing the measured capacitances and/or representations of the measured capacitances to any number of pixel concentration thresholds.

In some embodiments, the measured capacitances may be a value representing a combination of measured capacitances associated with multiple pixels, such as an average of the measured capacitances, a mean of the measured capacitances, etc. In some embodiments, the representations of the measured capacitances may be a representation of a combination of representations of the measured capacitances associated with multiple pixels, such as a number of pixels of a degree of health, a percentage of the area that the pixels of a degree of health cover, etc.

The measured capacitances and/or representations of the measured capacitances may be compared to a binary pixel concentration threshold for which the comparison may indicate that an area is unhealthy in response to the measured capacitances and/or representations of the measured capacitances not exceeding the binary pixel concentration threshold. The comparison may indicate that an area is healthy in response to the measured capacitance and/or representations of the measured capacitances exceeding the binary pixel concentration threshold.

The measured capacitance may be compared to multiple stepped pixel concentration thresholds for which the comparison may indicate that the area is of a degree of health in response to the measured capacitances and/or representations of the measured capacitances not exceeding a first stepped pixel concentration threshold and exceeding a second stepped pixel concentration threshold.

At the ends of a spectrum of designated health statuses, the measured capacitances and/or representations of the measured capacitances may be compared to a stepped pixel concentration threshold for which the comparison may indicate that the area is of a degree of health at a first end of the spectrum in response to the measured capacitances and/or representations of the measured capacitances not exceeding a third stepped pixel concentration threshold. The comparison may indicate that the area is of a degree of health at a second end of the spectrum in response to the measured capacitances and/or representations of the measured capacitances exceeding a fourth stepped concentration threshold.

In some embodiments, the analysis may compare the concentration of pixels of different degrees of health separately and determine from the combined results of the comparisons a degree of health of the area. In some embodiments, the degree of health may be represented by values in any format, such as bits, characters, percentages, values on a scale, etc.

In some embodiments, creation of the touch-profile may include tracking a record of use of the touch-panel during normal use of the computing device. The processing device may determine from patterns of use of the touch-panel whether areas of the touchscreen are damaged such that the damage discourages the user from interacting with the damaged areas. For example, a crack in the touchscreen may be sharp and may discourage the user from interacting with the cracked part of the touchscreen to avoid injury. The touch-panel area associated with the cracked area of the touchscreen may exhibit self-diagnostic test results that indicate little to no damage to the touch-panel.

However, a cracked area of a touchscreen that is not used by the user is similarly useful as an unhealthy or nonfunctional area of the touch-panel. Therefore, the processing device may indicate in the touch-profile test results for the unused and/or rarely used touch-panel area associated with the cracked area of the touchscreen that simulate damage to the touch-panel. Similarly, the processing device may indicate in the touch-profile representations and/or comparison results of the simulated self-diagnostic test results as described above for the self-diagnostic test results.

In block 306, the processing device may embed the touch-profile into the OS framework. The processing device may store the touch-profile to a memory of the computing device in a manner that makes the touch-profile accessible to the OS and any applications executing on the computing device. The touch-profile may be stored in any format, such as a database, a data structure, etc.

In determination block 308, the processing device may determine whether the touch-panel is functional. In some embodiments, the degrees of health of a touch-panel may include a degree indicating that the touch-panel is nonfunctional and may similarly include any number of degrees that indicate that the touch-panel is functional. For example, whether the touch-panel is determined to be functional or nonfunctional may depend on comparisons of the measured capacitances and/or representations of the measured capacitances to the binary and/or stepped pixel concentration thresholds as described above to create the touch-profile in block 304. The touch-panel may be nonfunctional in response to the measured capacitances and/or representations of the measured capacitances not exceeding the binary pixel concentration threshold. The touch-panel may be functional in response to the measured capacitance and/or representations of the measured capacitances exceeding the binary pixel concentration threshold. The touch-panel may be nonfunctional, or the degree of health at the first end of the spectrum, in response to the measured capacitances and/or representations of the measured capacitances not exceeding the third stepped pixel concentration threshold.

All of the other comparisons of the measured capacitances and/or representations of the measured capacitances to stepped pixel concentration thresholds indicating other degrees of health may indicate that the touch-panel is functional. In some embodiments, these comparisons of the measured capacitances and/or representations of the measured capacitances to the binary and/or stepped pixel concentration thresholds may be implemented to create the touch-profile in block 304 as described above. In such embodiments, the degree of health indicated by the touch-profile may be read to determine whether the touch-panel is functional in determination block 308.

In some embodiments, the touch-profile may provide a data to the processing device to make the comparisons of the measured capacitances and/or representations of the measured capacitances to the binary and/or stepped concentration thresholds, as described above, to determine whether the touch-panel is functional in determination block 308.

In some embodiments, the results of the comparisons from the touch-profile indicating the health of various areas of the touch-panel may be compared to a touch-panel functionality threshold. For example, the results of the comparisons from the touch-profile indicating unfavorable degrees of health, such a nonfunctional or unhealthy to varying degrees, may be combined to represent the area of the touch-panel exhibiting the unfavorable degrees of health. The combined unfavorable degrees of health representation may be compared to the touch-panel functionality threshold and the touch-panel may be determined to be nonfunctional in response to determining that the combined unfavorable degrees of health representation exceeds the touch-panel functionality threshold. The touch-panel may be determined to be functional in response to determining that the combined unfavorable degrees of health representation does not exceed the touch-panel functionality threshold. Similar comparisons to the touch-panel functionality threshold may be implemented for a combination of favorable degrees of health, such as functional or healthy, to determine whether the touch-panel is functional.

In response to determining that the touch-panel is functional (i.e., determination block 308="Yes"), the processing device may determine whether the touch-panel is healthy in determination block 310. In some embodiments, the degrees of health of a touch-panel indicating that the touch-panel is functional may further indicate whether the touch-panel is healthy or unhealthy to varying degrees. For example, whether the touch-panel is determined to be healthy or unhealthy may depend on comparisons of the measured capacitances and/or representations of the measured capacitances to the binary and/or stepped pixel concentration thresholds as described above to create the touch-profile in block 304.

The processing device may determine that the touch-panel may be unhealthy in response to the measured capacitances and/or representations of the measured capacitances not exceeding the binary pixel concentration threshold. The processing device may determine that the touch-panel may be healthy in response to the measured capacitance and/or representations of the measured capacitances exceeding the binary pixel concentration threshold. The processing device may determine that the touch-panel may be healthy, or the degree of health at the second end of the spectrum, in response to the measured capacitances and/or representations of the measured capacitances exceeding the fourth stepped pixel concentration threshold.

All of the other comparisons of the measured capacitances and/or representations of the measured capacitances to stepped pixel concentration thresholds indicating other degrees of health may indicate that the touch-panel is unhealthy to varying degrees. In some embodiments, these comparisons of the measured capacitances and/or representations of the measured capacitances to the binary and/or stepped pixel concentration thresholds may be implemented to create the touch-profile in block 304 as described above. In such embodiments, the degree of health indicated by the touch-profile may be read by the processing device to determine whether the touch-panel is healthy in determination block 310. In some embodiments, the touch-profile may provide data to the processing device to make the comparisons of the measured capacitances and/or representations of the measured capacitances to the binary and/or stepped concentration thresholds, as described above, to determine whether the touch-panel is healthy in determination block 310.

Further, in some embodiments, the processing device may compare the results of the comparisons from the touch-profile indicating the health of various areas of the touch-panel to any number of touch-panel health thresholds. For example, the results of the comparisons from the touch-profile indicating unfavorable degrees of health, such a nonfunctional or unhealthy to varying degrees, may be combined by the processing device to represent the area of the touch-panel exhibiting the unfavorable degrees of health. The combined unfavorable degrees of health representation may be compared by the processing device to the touch-panel health thresholds and the processing device may determine that the touch-panel is unhealthy in response to determining that the combined unfavorable degrees of health representation does not exceed at least one of the touch-panel health thresholds. The processing device may determine that the touch-panel is healthy in response to determining that the combined unfavorable degrees of health representation exceeds a particular one of the touch-panel health thresholds. Similar comparisons to the touch-panel health thresholds may be implemented by the processing device for a combination of favorable degrees of health, such as functional or healthy, to determine whether the touch-panel is healthy.

In response to determining that the touch-panel is healthy (i.e., determination block 310="Yes"), the processing device may continue to use the touch-panel as normal in block 312. In some embodiment the processing device may control the display of UIs, such as for an OS and/or an application executing on the computing device, on a display unit of the touchscreen. To continue to use the touch-panel as normal in block 312, the processing device may control the display of the UIs without modification to the functions of controlling the display of the UIs. In some embodiment the processing device may interpret inputs from the touch-panel and/or control transmission of the inputs from the touch-panel to another processing device. To continue to use the touch-panel as normal in block 312, the processing device may interpret inputs from the touch-panel and/or control transmission of the inputs from the touch-panel to another processing device without modification to the functions of interpreting the inputs from the touch-panel and/or control of transmission of the inputs.

Figure 5:
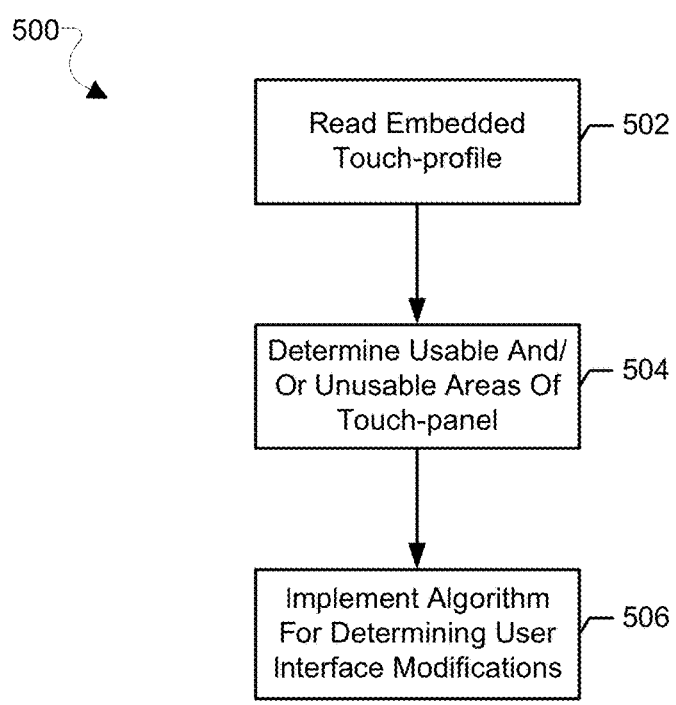
FIG. 5 is a process flow diagram illustrating a method for determining UI modifications according to various embodiments.

In response to determining that the touch-panel is not healthy (i.e., determination block 310="No"), the processing device may determine UI modifications in optional block 314, as described further herein with reference to the method 500 in FIG. 5. An unhealthy touch-panel may have areas that do not properly sense user inputs, sensing user inputs inaccurately and/or not sensing user inputs at all. In some embodiments the processing device may determine generic UI modifications for any UI displayed on the display unit of the touchscreen to compensate for the areas of the touch-panel that do not properly sense user inputs and to allow a user to interact with the OS and/or application via the modified UI. Generic UI modifications may be used for UIs of an OS or an application not enabled to modify its own UI to account for an unhealthy touch-panel. In some embodiments, the processing device may have knowledge and/or may be notified that an OS and/or application is enabled to modify its own UI and the processing device may not determine UI modifications in optional block 314. In some embodiments, a setting on the computing device may turn off the functionality of determining UI modifications in optional block 314. In some embodiments, a computing device may not be configured with the functionality of determining UI modifications in optional block 314. In some embodiments, an OS and/or application enabled to modify its own UI may override the generic modifications.

In block 316, the processing device may notify an OS and/or application executing on the computing device that the touch-panel is unhealthy. In some embodiments, the processing device may set a flag in a dedicated register, that may be checked by an OS and/or application, to notify the OS and/or application that the touch-panel is unhealthy. In some embodiments, the processing device may provide a notification signal to the OS and/or application that the touch-panel is unhealthy.

In optional block 318, the processing device may implement the UI modifications. The UI modifications implemented by the processing device for an unhealthy touch-panel may be the UI modifications determined by the processing device in optional block 314. In some embodiments, to implement the UI modifications, the processing device may map a UI of an OS and/or application to different areas of the touch-panel than when mapping an unmodified UI to the touch-panel. In some embodiments, to implement the UI modifications, the processing device may map a UI of an OS and/or application to different input devices (e.g., speaker 110, microphone 112, physical button 124, peripheral device 128 in FIG. 1) of the computing device.

In response to determining that the touch-panel is not functional (i.e., determination block 308="No"), the processing device may determine UI modifications in optional block 320, as described further herein with reference to the method 500 in FIG. 5. A nonfunctional touch-panel may have areas, such as all or nearly all of the touch-panel, that do not properly sense user inputs, sensing user inputs inaccurately and/or not sensing user inputs at all. In some embodiments the processing device may determine generic UI modifications for any UI displayed on the display unit of the touchscreen to compensate for the areas of the touch-panel that do not properly sense user inputs and to allow a user to interact with the OS and/or application via the modified UI. Generic UI modifications may be used for UIs of an OS or an application not enabled to modify its own UI to account for a nonfunctional touch-panel. In some embodiments, the processing device may have knowledge and/or may be notified that an OS and/or application is enabled to modify its own UI and the processing device may not determine UI modifications in optional block 320.

In some embodiments, a setting on the computing device may turn off the functionality of determining UI modifications in optional block 320. In some embodiments, a computing device may not be configured with the functionality of determining UI modifications in optional block 320. In some embodiments, an OS and/or application enabled to modify its own UI may override the generic modifications.

In block 322, the processing device may notify a user of the computing device that the touch-panel is nonfunctional. The processing device may notify the user via various annunciation methods that may include a visual message on the display unit of the touchscreen and/or an audible message via a speaker (e.g., speaker 110 in FIG. 1).

On block 324, the processing device may notify an OS and/or application executing on the computing device that the touch-panel is nonfunctional. In some embodiments, the processing device may set a flag in a dedicated register, that may be checked by an OS and/or application, to notify the OS and/or application that the touch-panel is nonfunctional. In some embodiments, the processing device may provide a notification signal to the OS and/or application that the touch-panel is nonfunctional.

In optional block 326, the processing device may implement the UI modifications. The UI modifications implemented by the processing device for a nonfunctional touch-panel may be the UI modifications determined by the processing device in optional block 320. In some embodiments, to implement the UI modifications, the processing device may map a UI of an OS and/or application to different input devices (e.g., speaker 110, microphone 112, physical button 124, peripheral device 128 in FIG. 1) of the computing device.

Figure 4:
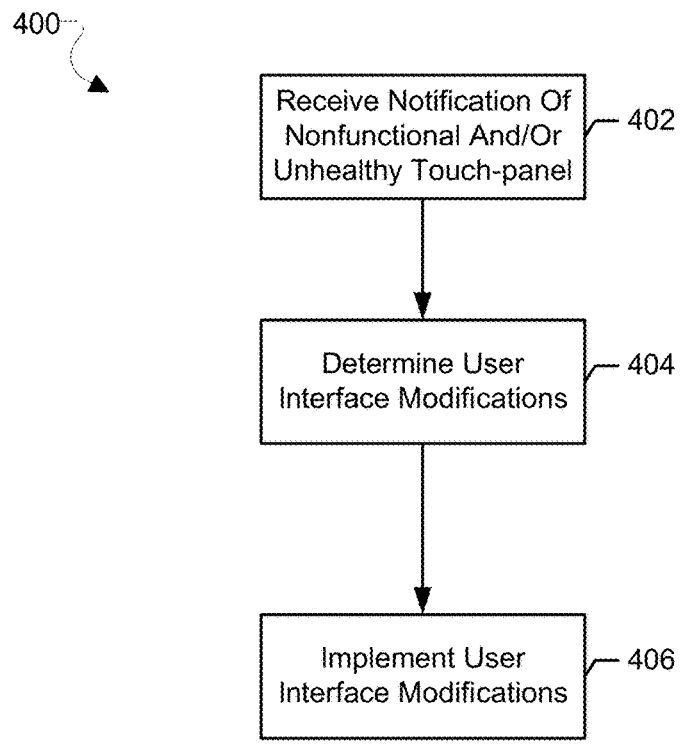
FIG. 4 is a process flow diagram illustrating a method for operating system and/or application refining UI behavior according to various embodiments.

FIG. 4 illustrates a method 400 for OS and/or application refining UI behavior according to various embodiments. The method 400 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a OS and/or application refining UI behavior system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 400 is referred to herein as a "processing device."

In block 402, the processing device may receive a notification indicating an unhealthy and/or a nonfunctional touch-panel. The notification may be read by the processing device from a dedicated register and/or received in a notification signal. The processing device may receive the notification directed to an OS and/or an application executing on the computing device.

In block 404 the processing device may determine UI modifications for the OS and/or the application executing on the computing device, as described further herein with reference to the method 500 in FIG. 5. An unhealthy and/or nonfunctional touch-panel may have areas that do not properly sense user inputs, sensing user inputs inaccurately and/or not sensing user inputs at all. In some embodiments the processing device may determine UI modifications specific to the OS and/or the application executing on the computing device for the UI displayed on a display unit of a touchscreen (e.g., touchscreen 126 in FIG. 1) to compensate for the areas of the touch-panel that do not properly sense user inputs and to allow a user to interact with the OS and/or application via the modified UI.

In block 406, the processing device may implement the UI modifications. In some embodiments, to implement the UI modifications for an unhealthy touch-panel, the processing device may map a UI of the OS and/or the application executing on the computing device to different areas of the touch-panel than when mapping an unmodified UI to the touch-panel. In some embodiments, to implement the UI modifications for an unhealthy and/or nonfunctional touch-panel, the processing device may map a UI of the OS and/or the application executing on the computing device to different input devices (e.g., speaker 110, microphone 112, physical button 124, peripheral device 128 in FIG. 1) of the computing device. In some embodiments, the OS and/or the application enabled to modify its own UI may override generic UI modifications determined as described in optional blocks 314 and 320 with reference to the method 300 in FIG. 3.

FIG. 5 illustrates a method 500 for determining UI modifications according to various embodiments. The method 500 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a OS and/or application refining UI behavior system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 500 is referred to herein as a "processing device."

In block 502, the processing device may read the embedded touch-profile. The processing device may access the touch-profile from the memory of the computing device. The processing device may retrieve from the touch-profile data indicating which pixels of a touchscreen (e.g., touchscreen 126 in FIG. 1) are unhealthy and/or which pixels are healthy and/or a degree to which the pixels are unhealthy and/or healthy, as described in creating the touch-profile in block 304 with reference to the method 300 in FIG. 3. The data may include a measured capacitance of a capacitive sensor of a touch-panel associated with a pixel and/or a representation of the measured capacitance of the associated capacitive sensor. The representation of the measured capacitance may include an indication of a degree of health of the pixel represented by values in any format, such as bits, characters, percentages, values on a scale, etc. The data may include a location of the pixel on the touchscreen.

In some embodiments, the touch-profile may include indicating which areas of a touchscreen are unhealthy and/or which areas are healthy and/or a degree to which the areas are unhealthy and/or healthy, as described in creating the touch-profile in block 304 with reference to the method 300 in FIG. 3. The areas of the touchscreen may correspond to a concentration of pixels, and, thus, may correspond to any number of capacitive sensors of a touch-panel. The data may include a measured capacitance of a capacitive sensor of a touch-panel associated with an area of the touchscreen and/or a representation of the measured capacitance of the associated capacitive sensor. The representation of the measured capacitance may include an indication of a degree of health of the area represented by values in any format, such as bits, characters, percentages, values on a scale, etc. The data may include a size and/or location of an area on the touch-panel.

In block 504, the processing device may determine usable and/or unusable pixels and/or areas of the touch-panel. The processing device may use the data from the touch-profile to determine whether pixels and/or areas of the touch-panel are usable. For example, a UI of an OS and/or an application executing on the computing device may assign a first area of the touch-panel for receiving a user input. An unhealthy second area of the touch-panel may at least overlap with the first area of the touch-panel, but may do so in a manner such that receiving the user input via the first area is not materially impeded, and, therefore, the unhealthy second area of the touch-panel may still be useable. Conversely, the second area may overlap the first area in a manner which does materially impede receipt of the user input via the first area, and the second area may be determined to be unusable.

The determination as to whether a pixel and/or area is usable may be made via various methods in block 504. For example, the processing device may compare the first area and the second area to an overlap threshold for an amount of overlapping area to indicate whether the second area is usable. A comparison to the degree of health of an area to a degree of health threshold may indicate whether the area is usable. Machine learning trained algorithms using the data for an area may be used by the processing device to determine whether the area is usable. Any combination of these and/or other methods for determining whether a pixel and/or area of a touch-panel is usable may be implemented. The methods for determining whether a pixel and/or area of a touch-panel is usable may be tailored or machine learning trained specifically for generic use of the touchscreen and/or specific use of the touchscreen for a UI of an OS and/or an application.

In some embodiments, for determining generic modifications of a UI, the processing device may be more strict in determining whether a pixel and/or area is usable as compared to determining UI modifications for an OS and/or application, as the generic modifications may be more broadly applicable that the modifications for the OS and/or application. In some embodiments, the machine learning trained methods for determining whether a pixel and/or area of a touch-panel is usable specifically for an OS and/or application may be implemented by the OS and/or application via instructions executing on the processing device.

In block 506, the processing device may implement a method for determining a UI modification based on the usable and/or nonusable pixels and/or areas of the touch-panel. In some embodiments, the method for determining a UI modification may be user controls for sizing and/or moving the UI and/or an element of the UI, such as an icon, a menu and/or menu option, an interactive element, etc. In some embodiments, the method for determining a UI modification may be a best fit algorithm configured to size and/or move a UI for mapping the UI to usable portions of the touch-panel. In some embodiments, the method for determining a UI modification may include an algorithm for shaping, sizing, and/or moving elements of a UI for mapping the elements to usable portions of the touch-panel. In some embodiments, the method for determining a UI modification may include an algorithm for mapping a location outside of an unusable area for user interaction with an element of a UI inside of the unusable area. In some embodiments, the method for determining a UI modification may include an algorithm for interpreting a user interaction with a UI across usable areas of the UI that is interrupted by an unusable area of the UI. In some embodiments, the method for determining a UI modification may include an algorithm for providing an alternative method for interacting with the UI, such as a mouse control in a usable area of the touch-panel to interact with the UI, voice interaction with the UI, physical button (e.g., physical button 124 in FIG. 1) interaction with the UI, and/or peripheral device (e.g., peripheral device 128 in FIG. 1) interaction with the UI. Various examples of UI modifications are described herein with reference to FIGS. 10A-21.

In some embodiments, selection and/or implementation of the method for determining a UI modification may be implemented in a machine learning trained algorithm trained to select and/or implement the method for determining a UI modification for generic use of the touch-panel and/or specific use of the touch-panel for an OS and/or application. In some embodiments, the machine learning trained algorithm trained to select and/or implement the method for determining a UI modification for specific use of the touch-panel for an OS and/or application may be implemented by the OS and/or application via instructions executing on the processing device.

FIGS. 6-9B illustrate examples representations of results from a self-diagnostic test of a touch-panel. With reference to FIGS. 1-3, and as described with reference to the method 300 in FIG. 3, a computing device (e.g., computing device 100 in FIG. 1) having a touchscreen (e.g., touchscreen 126 in FIG. 1) may implement a self-diagnostic test of a touch-panel of the touchscreen. The self-diagnostic test may test the capacitance of capacitance sensors of the touch-panel.

Figure 6:
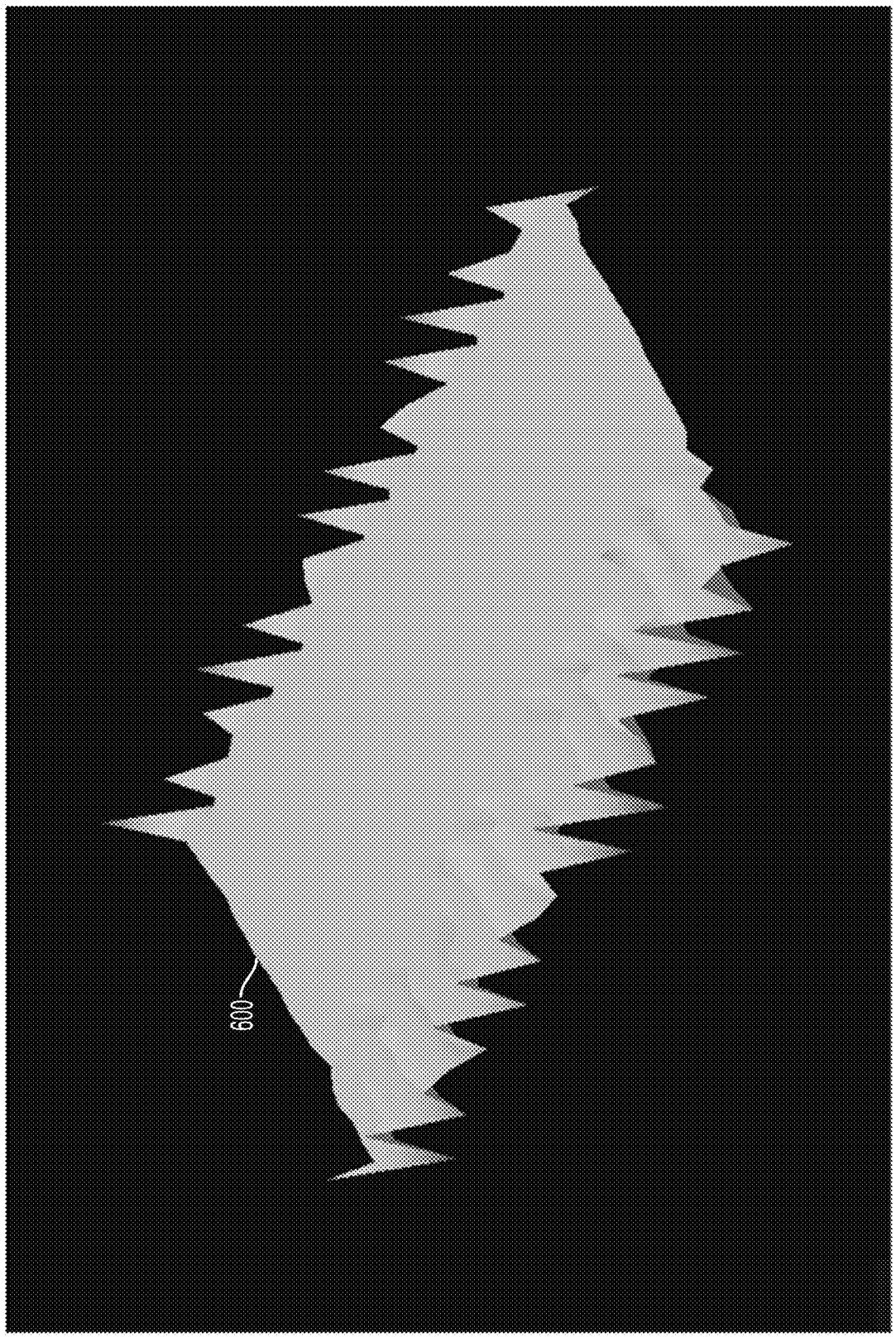
FIG. 6 is a graph diagram illustrating an example of touch-panel self-diagnostic testing results suitable for implementing various embodiments.

FIG. 6 illustrates an example graph of results from a self-diagnostic test of a touch-panel. In this example, the graph 600 illustrates measurements of the capacitance of the capacitance sensors of the touch-panel. The graph 600 is formatted to correspond with the layout of the capacitance sensors of the touch-panel. For example, the touch-panel may be a rectangular shape with capacitance sensors laid out in manner that conforms with the rectangular shape of the touch-panel. The graph 600 illustrates the rectangular layout the capacitance sensors such that a location of a capacitance sensor on the touch-panel corresponds with the same location in the graph 600.

Further, the graph 600 illustrates a magnitude of the measured capacitance for the capacitance sensors. For example, the majority of the graph 600 illustrates a center portion that is a relatively flat plane, where as the graph 600 illustrates two of the edge portions with variable heights above and below the center portion. The relatively flat plane of the center portion may indicate that the capacitance sensors corresponding to the center portion exhibit measured capacitance readings equal to or within a certain range of capacitance that is expected and that may be interpreted to indicate healthy and/or functional capacitance sensors. As discussed herein, the capacitance sensors may be correlated to pixels of the touchscreen, and, therefore, the graph 600 may also be interpreted to indicate healthy and/or functional pixels in the same center portion of the graph 600. The variable heights of the edge portions may indicate that the capacitance sensors corresponding to the edge portions exhibit measured capacitance readings not equal to or outside the certain range of capacitance that is expected and that may be interpreted to indicate unhealthy and/or non functional capacitance sensors. Thus, the graph 600 may also be interpreted to indicate unhealthy and/or nonfunctional pixels in the same edge portions of the graph 600.

FIGS. 7A-9B illustrate example pixel representations of touch-panel self-diagnostic testing results. The pixel representations 700a, 700b, 800a, 800b, 900a, 900b, illustrate representations of measurements of the capacitance of the capacitance sensors of the touch-panel. As discussed herein, the representations of measurements of the capacitance of the capacitance sensors may indicate degrees of health of the capacitance sensors. As the capacitance sensors may be correlated to pixels of the touchscreen, the representations of measurements of the capacitance of the capacitance sensors may indicate degrees of health of the pixels.

The pixel representations 700a, 700b, 800a, 800b, 900a, 900 may be formatted to correspond with the layout of the capacitance sensors of the touch-panel. For example, the touch-panel may be a rectangular shape with capacitance sensors laid out in manner that conforms with the rectangular shape of the touch-panel. The pixel representations 700a, 700b, 800a, 800b, 900a, 900b illustrate the rectangular layout the capacitance sensors such that a location of a pixel associated with a capacitance sensor on the touch-panel corresponds with the same location in the pixel representations 700a, 700b, 800a, 800b, 900a, 900b. The degrees of health of the pixels may be represented by the differently shaded pixels in the pixel representations 700a, 700b, 800a, 800b, 900a, 900b. For example, the gradient of shades going from lightest to darkest may represent degrees of health of pixels going from best health to worst health, such as from healthy and/or functional to unhealthy and/or nonfunctional, and in some embodiments, with varying degrees of healthy and/or unhealthy in between.

Figure 7B:
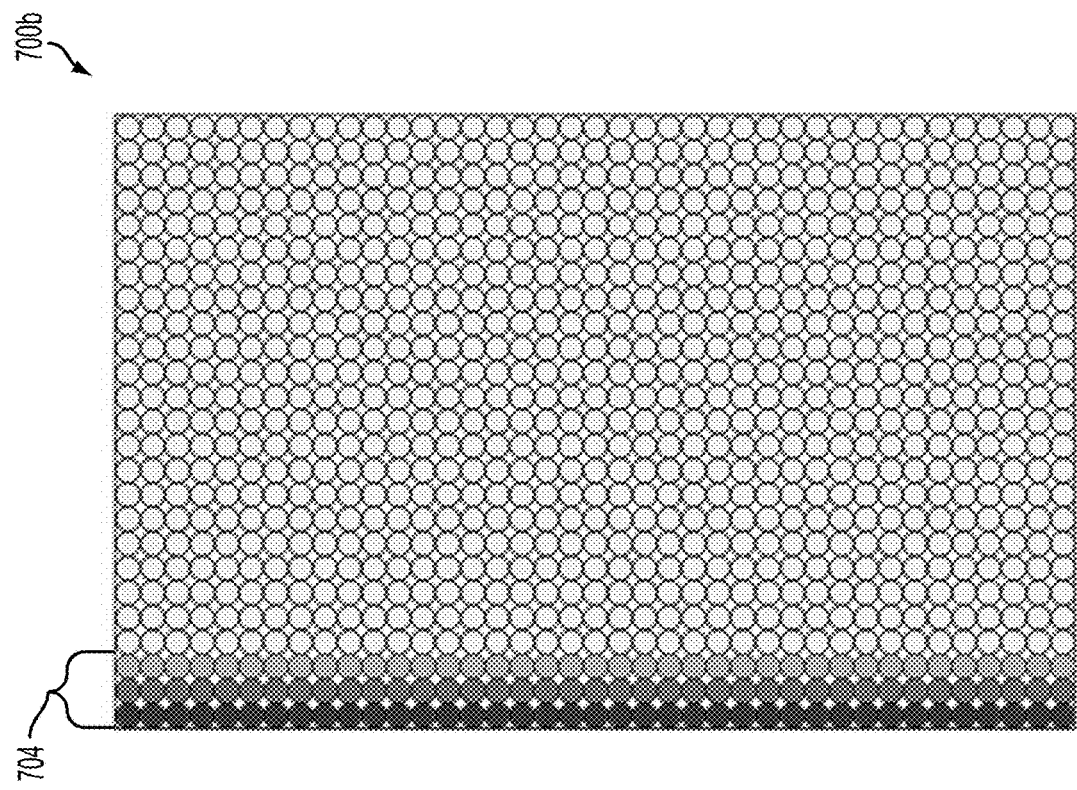
FIG. 7B is a representative diagram illustrating an example of a bitwise representation of touch-panel self-diagnostic testing results suitable for implementing various embodiments.
Figure 7A:
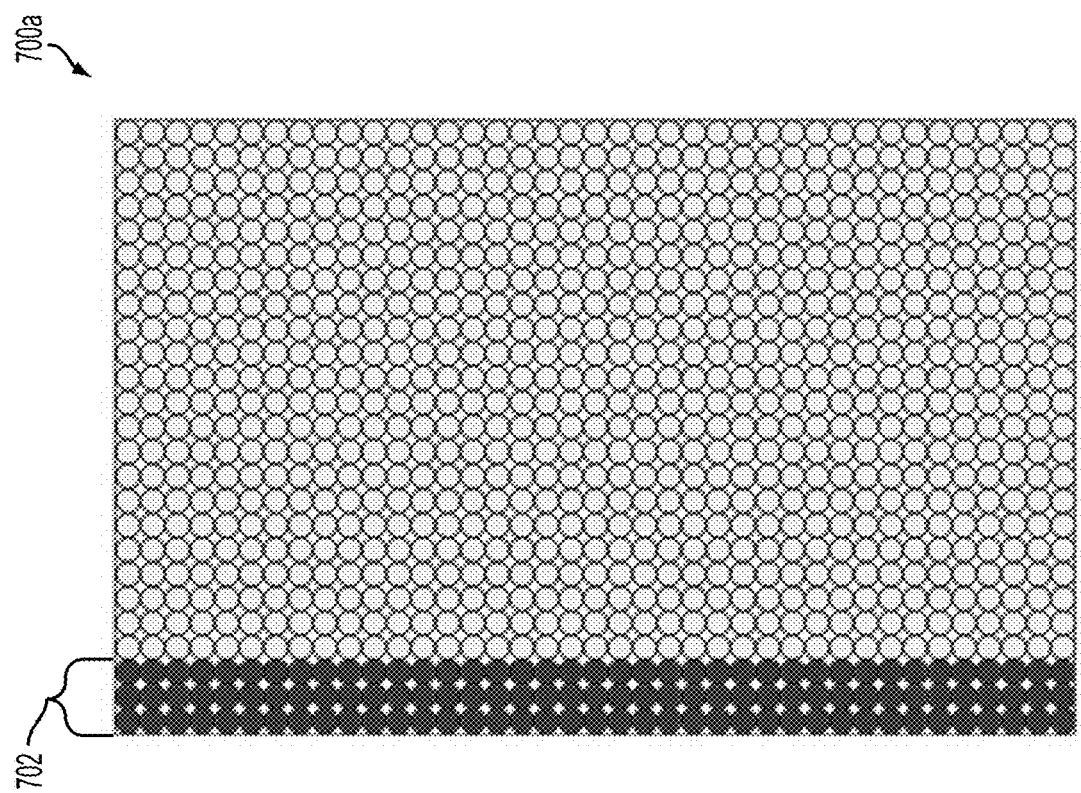
FIG. 7A is a representative diagram illustrating an example of a binary representation of touch-panel self-diagnostic testing results suitable for implementing various embodiments.

FIG. 7A illustrates an example of a binary representation of touch-panel self-diagnostic testing results. In this example, the pixel representation 700a is binary having two shades of pixels each indicating one of two degrees of health. For example, the dark shaded pixels may indicate unhealthy and/or nonfunctional pixels and the light shaded pixels may indicate healthy and/or functional pixels. A binary data representation of the degrees of health may include a single data bit having a value of "0" or "1". In this example the pixel representation 700a illustrates a column of unhealthy and/or nonfunctional pixels 702 three pixels wide and extending the entire length of the touch-panel. The remaining pixels of the pixel representation 700a may be healthy and/or functional.

FIG. 7B illustrates an example of a bitwise representation of touch-panel self-diagnostic testing results. In this example, the pixel representation 700b is bitwise having multiple shades of pixels each indicating one of multiple degrees of health. For example, the dark shaded pixels may indicate unhealthy and/or nonfunctional pixels, the light shaded pixels may indicate healthy and/or functional pixels, and the shaded pixels in between light and dark may indicate various degrees of healthy and/or unhealthy pixels. A bitwise data representation of the degrees of health may include a multiple data bits, for example, having values of "00" to "11". In this example the pixel representation 700b illustrates a column of unhealthy and/or nonfunctional pixels 704 three pixels wide and extending the entire length of the touch-panel, and having increasingly better health further from the edge of the pixel representation 700b. The remaining pixels of the pixel representation 700b may be healthy and/or functional.

Figure 8B:
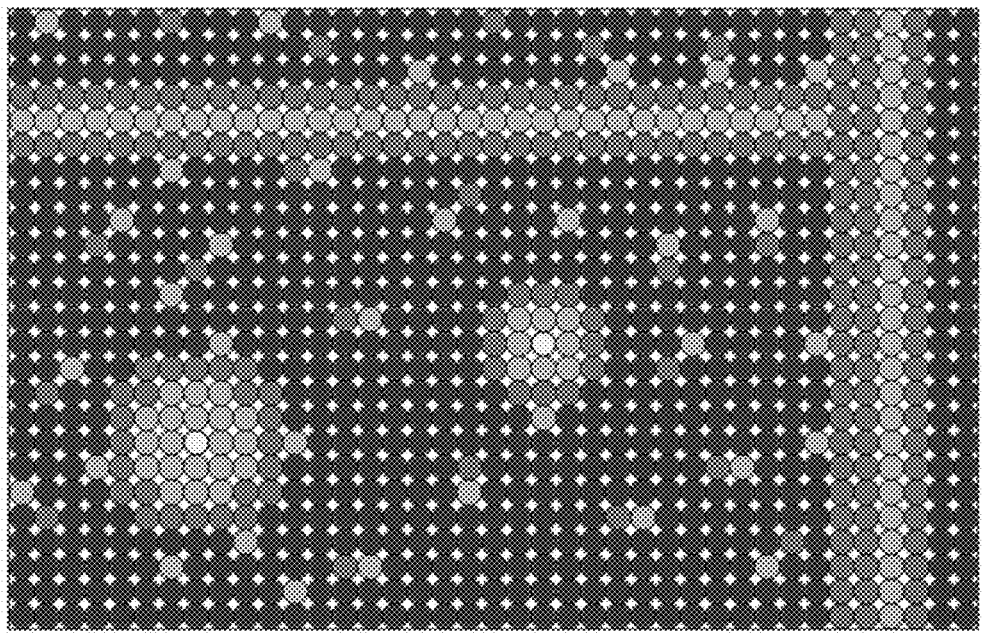
FIG. 8B is a representative diagram illustrating an example of a bitwise representation of touch-panel self-diagnostic testing results of a nonfunctional touch-panel suitable for implementing various embodiments.
Figure 8A:
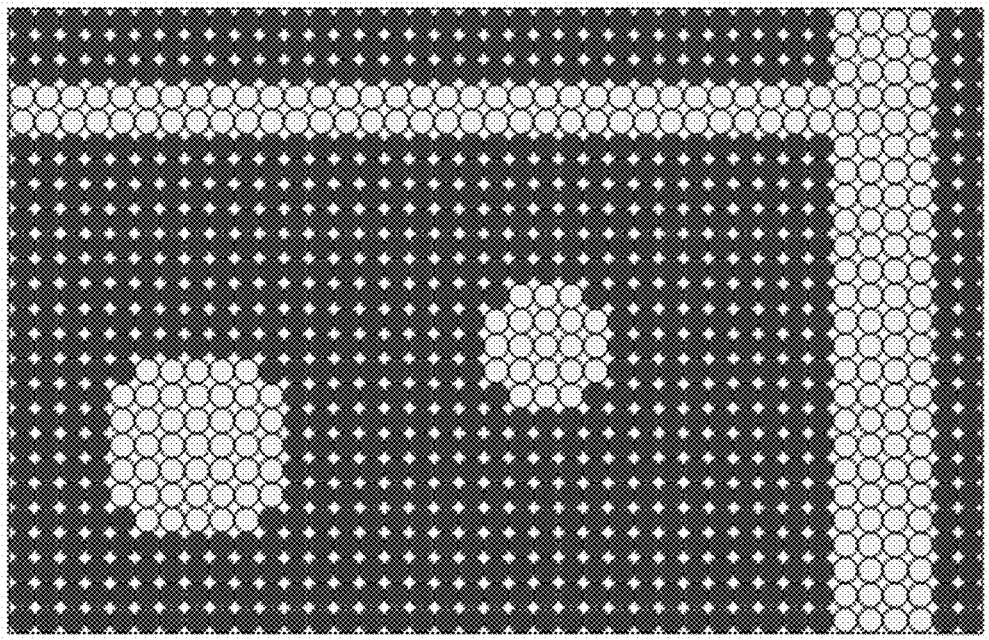
FIG. 8A is a representative diagram illustrating an example of a binary representation of touch-panel self-diagnostic testing results of a nonfunctional touch-panel suitable for implementing various embodiments.

FIG. 8A illustrates an example of a binary representation of touch-panel self-diagnostic testing results for a nonfunctional touch-panel. In this example, the pixel representation 800a is binary as described with reference to FIG. 7A. In this example the pixel representation 800a illustrates a majority of unhealthy and/or nonfunctional pixels. The remaining pixels of the pixel representation 800a may be healthy and/or functional. As described in block 304 and/or in determination block 308 with reference to the method 300 in FIG. 3, a determination that a touch-panel is nonfunctional may be made by comparing the data of and/or representing the touch-panel self-diagnostic testing results to any number of pixel health thresholds, pixel concentration thresholds, and/or touch-panel functionality thresholds.

FIG. 8B illustrates an example of a bitwise representation of touch-panel self-diagnostic testing results for a nonfunctional touch-panel. In this example, the pixel representation 800b is bitwise as described with reference to FIG. 7B. In this example the pixel representation 800b illustrates a majority of unhealthy and/or nonfunctional pixels. The remaining pixels of the pixel representation 800b may be healthy and/or functional. As described in block 304 and/or in determination block 308 with reference to the method 300 in FIG. 3, a determination that a touch-panel is nonfunctional may be made by comparing the data of and/or representing the touch-panel self-diagnostic testing results to any number of pixel health thresholds, pixel concentration thresholds, and/or touch-panel health thresholds.

Figure 9B:
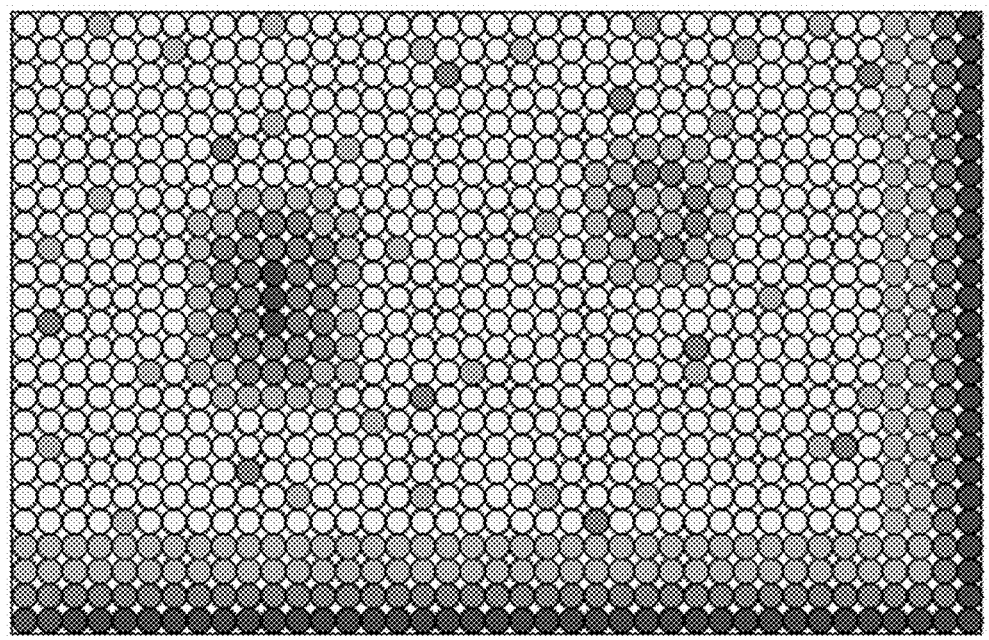
FIG. 9B is a representative diagram illustrating an example of a bitwise representation of touch-panel self-diagnostic testing results of an unhealthy touch-panel suitable for implementing various embodiments.
Figure 9A:
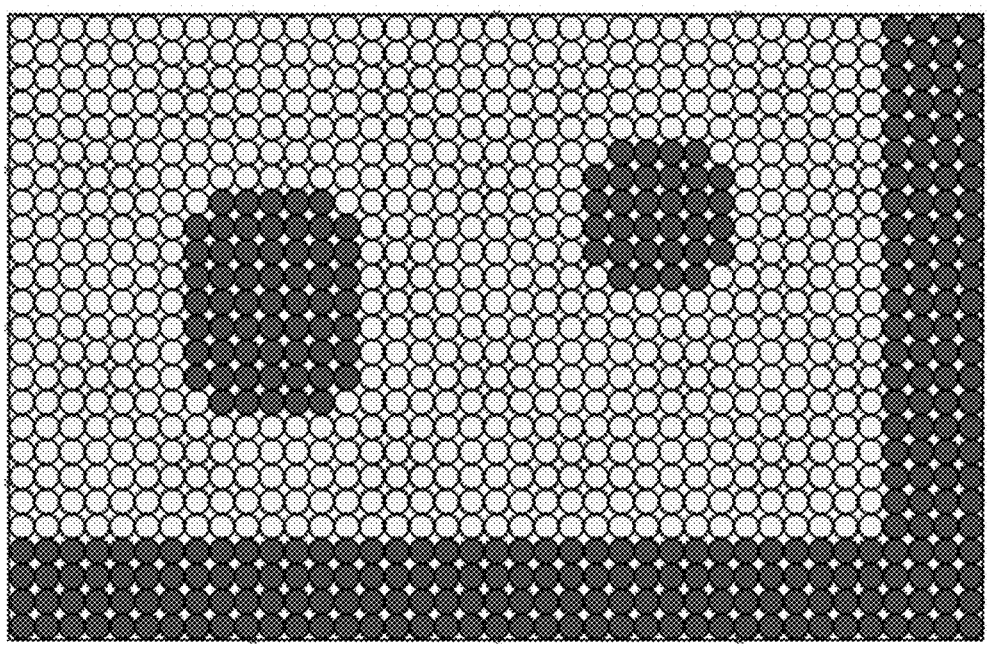
FIG. 9A is a representative diagram illustrating an example of a binary representation of touch-panel self-diagnostic testing results of an unhealthy touch-panel suitable for implementing various embodiments.

FIG. 9A illustrates an example of a binary representation of touch-panel self-diagnostic testing results for an unhealthy touch-panel. In this example, the pixel representation 900a is binary as described with reference to FIG. 7A. In this example the pixel representation 900a illustrates an "L" shaped area and two circular areas of unhealthy and/or nonfunctional pixels. The remaining pixels of the pixel representation 900a may be healthy and/or functional. As described in block 304 and/or in determination block 310 with reference to the method 300 in FIG. 3, a determination that a touch-panel is unhealthy may be made by comparing the data of and/or representing the touch-panel self-diagnostic testing results to any number of pixel health thresholds, pixel concentration thresholds, and/or touch-panel functionality thresholds.

FIG. 9B illustrates an example of a bitwise representation of touch-panel self-diagnostic testing results for an unhealthy touch-panel. In this example, the pixel representation 900b is bitwise as described with reference to FIG. 9B. In this example the pixel representation 900b illustrates an "L" shaped area, two circular areas, and various disperse areas of unhealthy and/or nonfunctional pixels. The remaining pixels of the pixel representation 900b may be healthy and/or functional. As described in block 304 and/or in determination block 310 with reference to the method 300 in FIG. 3, a determination that a touch-panel is unhealthy may be made by comparing the data of and/or representing the touch-panel self-diagnostic testing results to any number of pixel health thresholds, pixel concentration thresholds, and/or touch-panel functionality thresholds.

FIGS. 10A-21 illustrate various examples of UI modifications for an OS and/or an application. With reference to FIGS. 1-9, and as described with reference to the method 300 in FIG. 3 and the method 400 in FIG. 4, a computing device (e.g., computing device 100 in FIG. 1) having a touchscreen (e.g., touchscreen 126 in FIG. 1) may implement a UI modification for an OS and/or an application executing on the computing device. In some embodiments, the UI modification may be generic and applicable to any OS and/or application. In some embodiments, the UI modification may be implemented specifically for an OS and/or an application. The following examples are intended to be illustrative and do not limit the scope of the claims or the description herein. Further, a UI modification may include any combination of UI modifications, including, for example, combinations of the following examples.

Figure 10A:
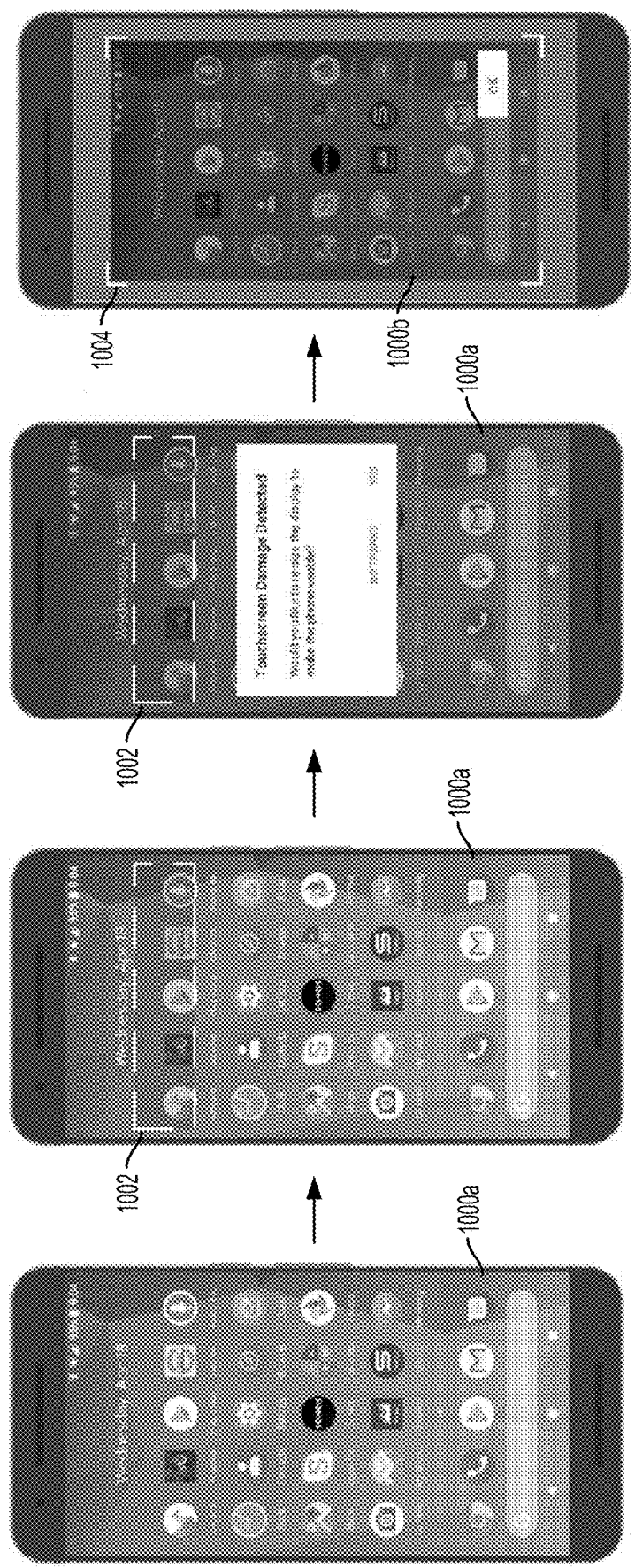
FIGS. 10A and 10B are UI process flow diagrams illustrating manual resizing and/or moving of a UI for a damaged touch-panel according to various embodiments.
Figure 10B:
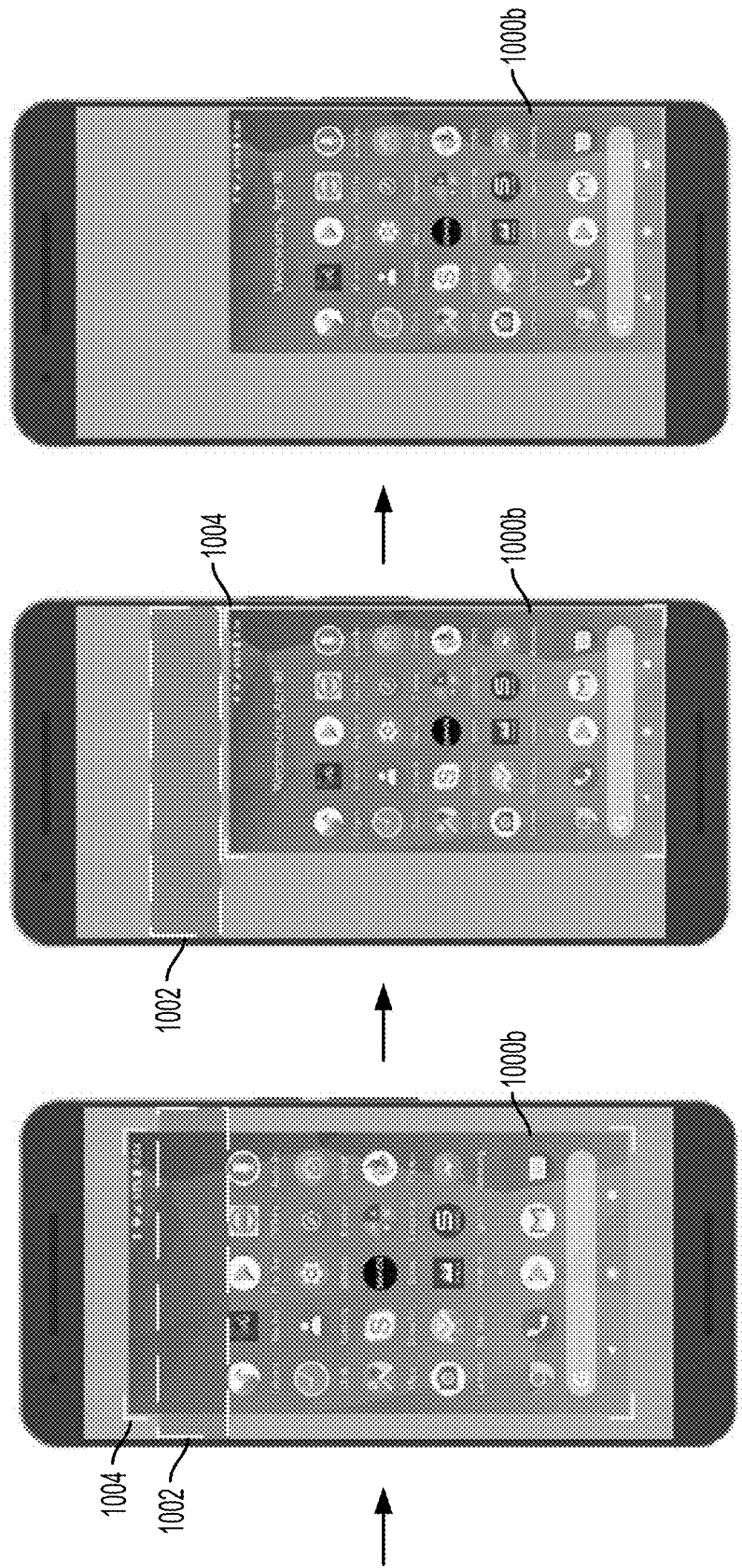

FIGS. 10A and 10B illustrate an example of manual resizing and/or moving of a UI for a damaged touch-panel. A UI 1000a may normally display on the touchscreen of the computing device. An event may occur that causes the touch-panel to become damaged, resulting in an unhealthy and/or nonfunctional area of the touch-panel 1002. In some embodiments, the computing device may notify a user that the unhealthy and/or nonfunctional area of the touch-panel 1002 is detected and prompt the user to resize and/or move the UI 1000a to avoid having areas of the UI 1000a mapped to the unhealthy and/or nonfunctional area of the touch-panel 1002.

The computing device may present the user with interactive handles 1004 on the touchscreen configured to respond to user inputs for resizing and/or moving the UI 1000a. User interaction with the interactive handles 1004 to resize and/or move the UI 1000a may result in a modified UI 1000b. The example in FIG. 10B illustrates that the modified UI 1000b is resized and moved such that the modified UI 1000b occupies less vertical and horizontal space of the touchscreen and is mapped only to areas of the touchscreen that are not the unhealthy and/or nonfunctional area of the touch-panel 1002.

In some embodiments, the unhealthy and/or nonfunctional area of the touch-panel 1002 may be highlighted on the touchscreen for indication of the unhealthy and/or nonfunctional area of the touch-panel 1002 to the user. The unhealthy and/or nonfunctional area of the touch-panel 1002 may be highlighted before and/or during the modification of the UI 1000a, 1000b. The unhealthy and/or nonfunctional area of the touch-panel 1002 may cease to be highlighted in response to completion of the modification of the UI 1000a, 1000b.

Figure 11B:
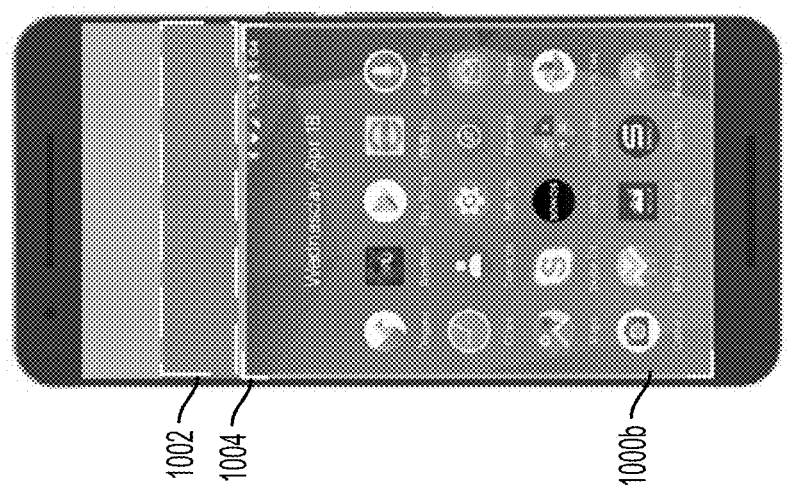
FIGS. 11A-11C are UI diagrams illustrating options for manual resizing and/or moving of a UI for a damaged touch-panel according to various embodiments.
Figure 11A:
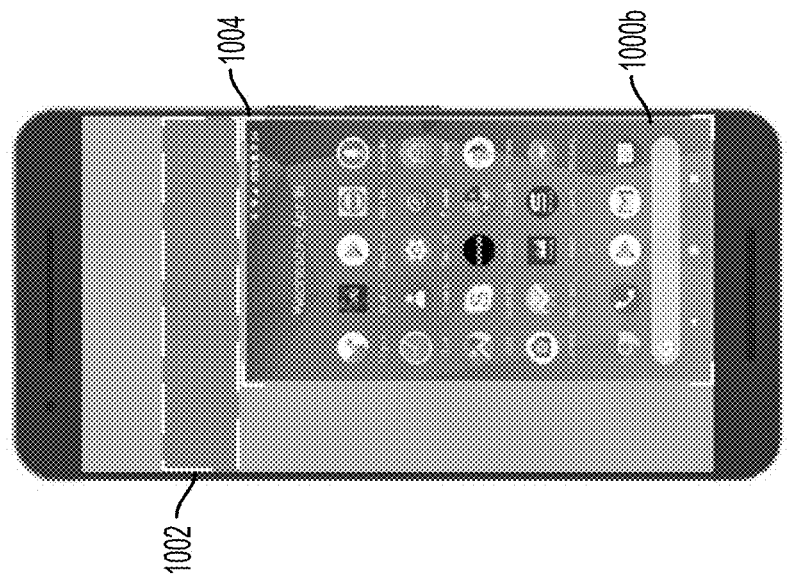
Figure 11C:
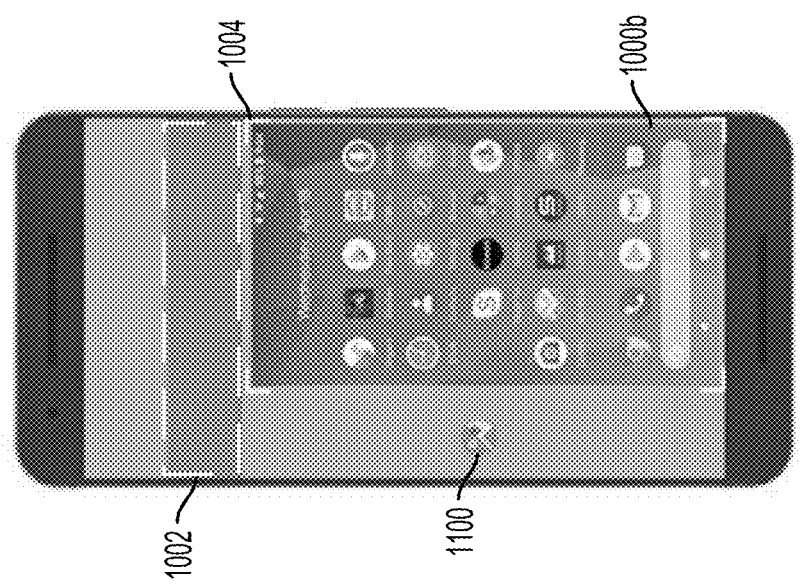

FIGS. 11A-11C illustrate example options for manual resizing and/or moving of a UI for a damaged touch-panel. The examples illustrated in FIGS. 11A-11C may be used in conjunction with the examples of manual resizing and/or moving of the UI illustrated in FIGS. 10A and 10B.

The example in FIG. 11A illustrates a modified UI 1000b that occupies less vertical and horizontal space of the touchscreen than the UI 1000a and is mapped only to areas of the touchscreen that are not the unhealthy and/or nonfunctional area of the touch-panel 1002.

The example in FIG. 11B illustrates a modified UI 1000b that occupies less vertical space of the touchscreen than and the same horizontal space of the touchscreen as the UI 1000a and is mapped only to areas of the touchscreen that are not the unhealthy and/or nonfunctional area of the touch-panel 1002.

The example in FIG. 11C illustrates a modified UI 1000b that occupies less vertical and horizontal space of the touchscreen than the UI 1000a, a UI element 1100, such as an icon, originally displayed in the UI 1000a placed outside of the modified UI 1000b, and that the modified UI 1000b and the icon 1100 are mapped only to areas of the touchscreen that are not the unhealthy and/or nonfunctional area of the touch-panel 1002.

Figure 12:
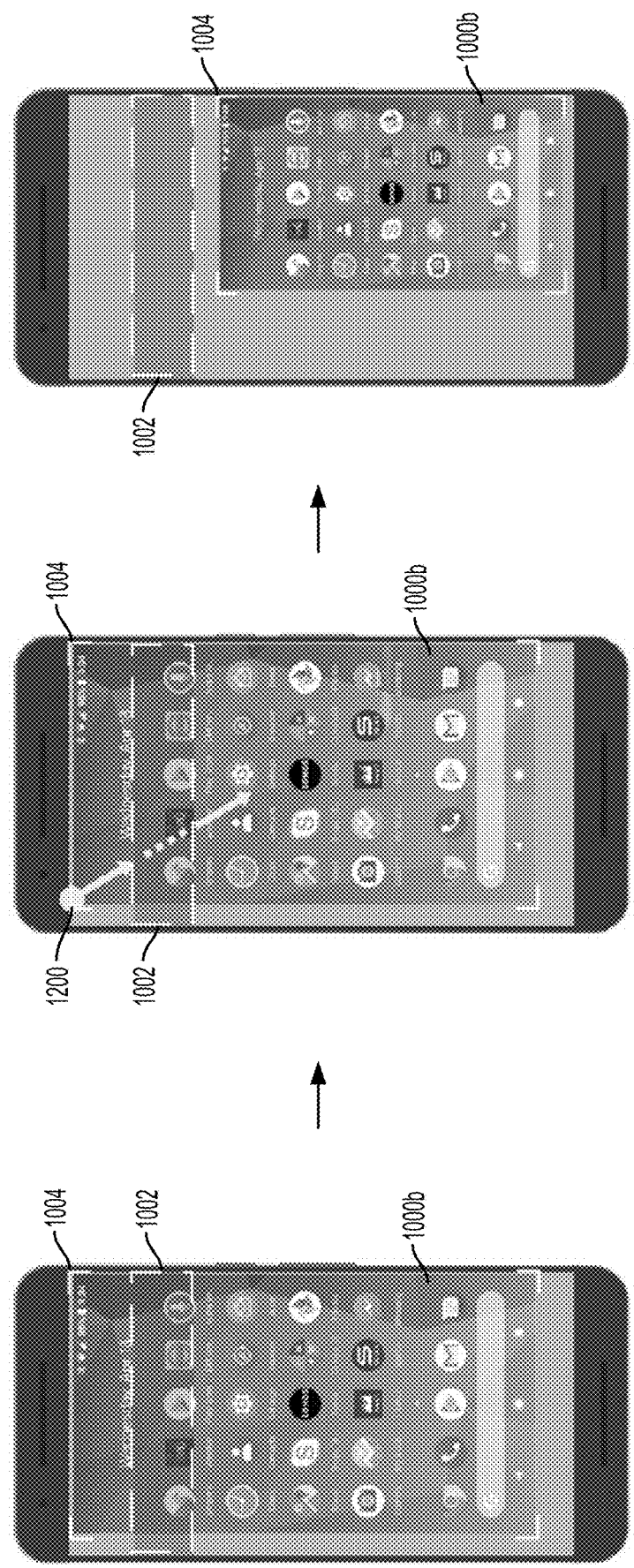
FIG. 12 is a UI process flow diagram illustrating manual resizing and/or moving of a UI for a damaged touch-panel using predictive swipe according to various embodiments.

FIG. 12 illustrates an example of manual resizing and/or moving of a UI for a damaged touch-panel using predictive swipe. The examples illustrated in FIG. 12 may be used in conjunction with the examples of manual resizing and/or moving of the UI illustrated in FIGS. 10A and 10B. An event may occur that causes the touch-panel to become damaged, resulting in an unhealthy and/or nonfunctional area of the touch-panel 1002.

The computing device may present the user with interactive handles 1004 on the touchscreen configured to respond to user inputs for resizing and/or moving the UI 1000a. User interaction with the interactive handles 1004 to resize and/or move the UI 1000a may result in a modified UI 1000b. However, to resize and/or move the UI 1000a, 1000b, the user may have to drag 1200 an interactive handle 1004 across the unhealthy and/or nonfunctional area of the touch-panel 1002, which may result in inaccurate and/or not sensed user inputs in the unhealthy and/or nonfunctional area of the touch-panel 1002.

The computing device may employ a predictive swipe algorithm to interpret that the drag 1200 beginning on a first side of the unhealthy and/or nonfunctional area of the touch-panel 1002 and ending on a second side of the unhealthy and/or nonfunctional area of the touch-panel 1002 was continuous between the first and second sides of the unhealthy and/or nonfunctional area of the touch-panel 1002. The predictive swipe algorithm may simulate to the computing device the user inputs across the unhealthy and/or nonfunctional area of the touch-panel 1002 and/or instruct the computing device to behave as if the user inputs across the unhealthy and/or nonfunctional area of the touch-panel 1002 were sensed. The computing device may respond by resizing and or moving the UI 1000a, 1000b as if the user inputs across the unhealthy and/or nonfunctional area of the touch-panel 1002 were sensed by the computing device. As a result, the modified UI 1000b may be resized and moved such that the modified UI 1000b occupies less vertical and horizontal space of the touchscreen and is mapped only to areas of the touchscreen that are not the unhealthy and/or nonfunctional area of the touch-panel 1002.

Figure 13:
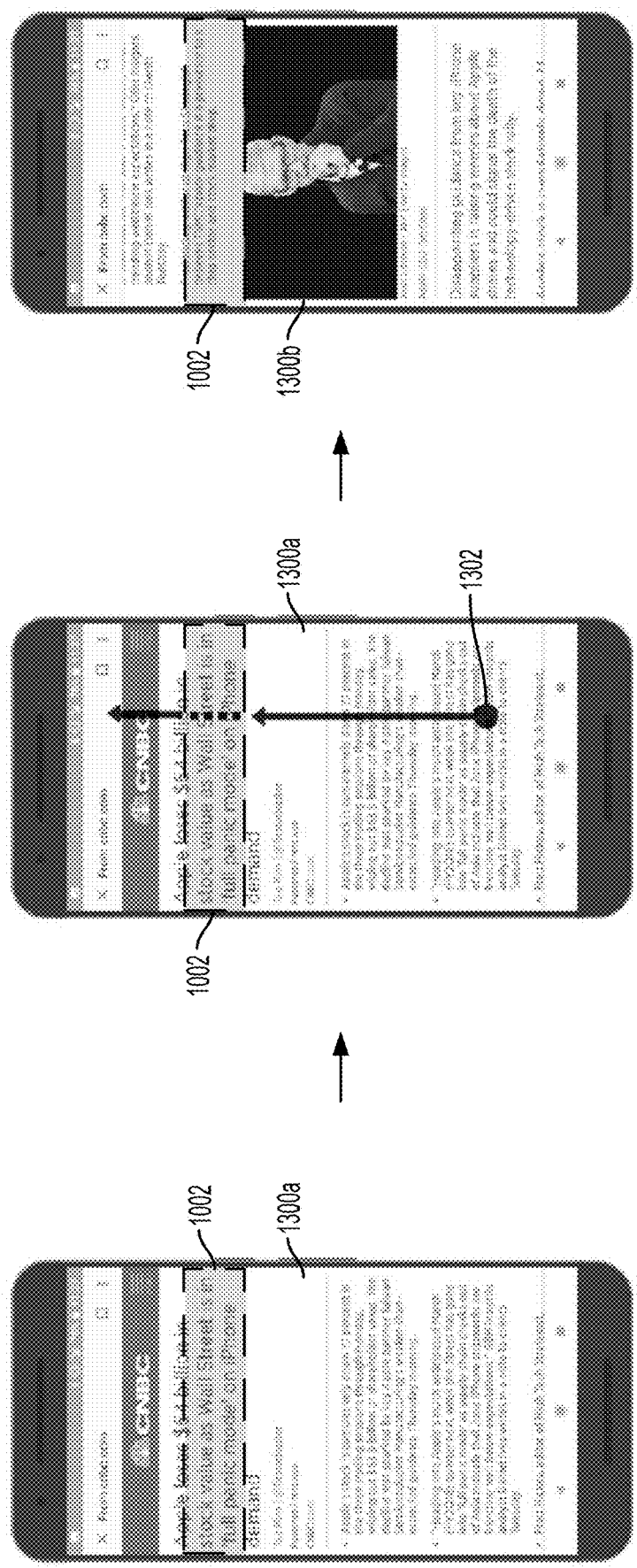
FIG. 13 is a UI process flow diagram illustrating predictive scrolling in a UI across a damaged area of a damaged touch-panel according to various embodiments.

FIG. 13 illustrates an example of predictive scrolling in a UI across a damaged area of a damaged touch-panel. As in the example illustrated in FIG. 10A, an event may occur that causes the touch-panel to become damaged, resulting in an unhealthy and/or nonfunctional area of the touch-panel 1002. A user of the computing device may interact with a UI 1300a such that the user may swipe 1302 the touchscreen across the unhealthy and/or nonfunctional area of the touch-panel 1002, which may result in inaccurate and/or not sensed user inputs in the unhealthy and/or nonfunctional area of the touch-panel 1002.

The computing device may employ a predictive swipe algorithm to interpret that the swipe 1302 beginning on a first side of the unhealthy and/or nonfunctional area of the touch-panel 1002 and ending on a second side of the unhealthy and/or nonfunctional area of the touch-panel 1002 was continuous between the first and second sides of the unhealthy and/or nonfunctional area of the touch-panel 1002. The predictive swipe algorithm may simulate to the computing device the user inputs across the unhealthy and/or nonfunctional area of the touch-panel 1002 and/or instruct the computing device to behave as if the user inputs across the unhealthy and/or nonfunctional area of the touch-panel 1002 were sensed. The computing device may respond by scrolling the UI 1300a, 1300b as if the user inputs across the unhealthy and/or nonfunctional area of the touch-panel 1002 were sensed by the computing device. As a result, the modified UI 1300b may change a display on the touchscreen based on content accessed according to a scrolling function.

In some embodiments, the unhealthy and/or nonfunctional area of the touch-panel 1002 may be highlighted on the touchscreen for indication of the unhealthy and/or nonfunctional area of the touch-panel 1002 to the user. The unhealthy and/or nonfunctional area of the touch-panel 1002 may be highlighted before, during, and/or after the modification of the UI 1300a, 1300b. The unhealthy and/or nonfunctional area of the touch-panel 1002 may cease to be highlighted in response to completion of the modification of the UI 1300a, 1300b.

FIG. 11 illustrates an example of automatic resizing and/or moving of a UI for a damaged touch-panel. A UI 1000a may normally display on the touchscreen of the computing device. An event may occur that causes the touch-panel to become damaged, resulting in an unhealthy and/or nonfunctional area of the touch-panel 1002. In some embodiments, the computing device may notify a user that the unhealthy and/or nonfunctional area of the touch-panel 1002 is detected and prompt the user to activate an automatic resize and/or move the UI 1000a to avoid having areas of the UI 1000a mapped to the unhealthy and/or nonfunctional area of the touch-panel 1002. The automatic resizing and/or moving the UI 1000a may result in a modified UI 1000b that is resized and moved such that the modified UI 1000b occupies less vertical and horizontal space of the touchscreen and is mapped only to areas of the touchscreen that are not the unhealthy and/or nonfunctional area of the touch-panel 1002.

In some embodiments, the unhealthy and/or nonfunctional area of the touch-panel 1002 may be highlighted on the touchscreen for indication of the unhealthy and/or nonfunctional area of the touch-panel 1002 to the user. The unhealthy and/or nonfunctional area of the touch-panel 1002 may be highlighted before and/or during the modification of the UI 1000a, 1000b. The unhealthy and/or nonfunctional area of the touch-panel 1002 may cease to be highlighted in response to completion of the modification of the UI 1000a, 1000b. In some embodiments, the automatic resizing and/or moving the UI 1000a may modify the UI 1000a such that the modified UI 1000b is modified in a manner similar to any combination of the examples illustrated in FIGS. 11A-11C.

Figure 15:
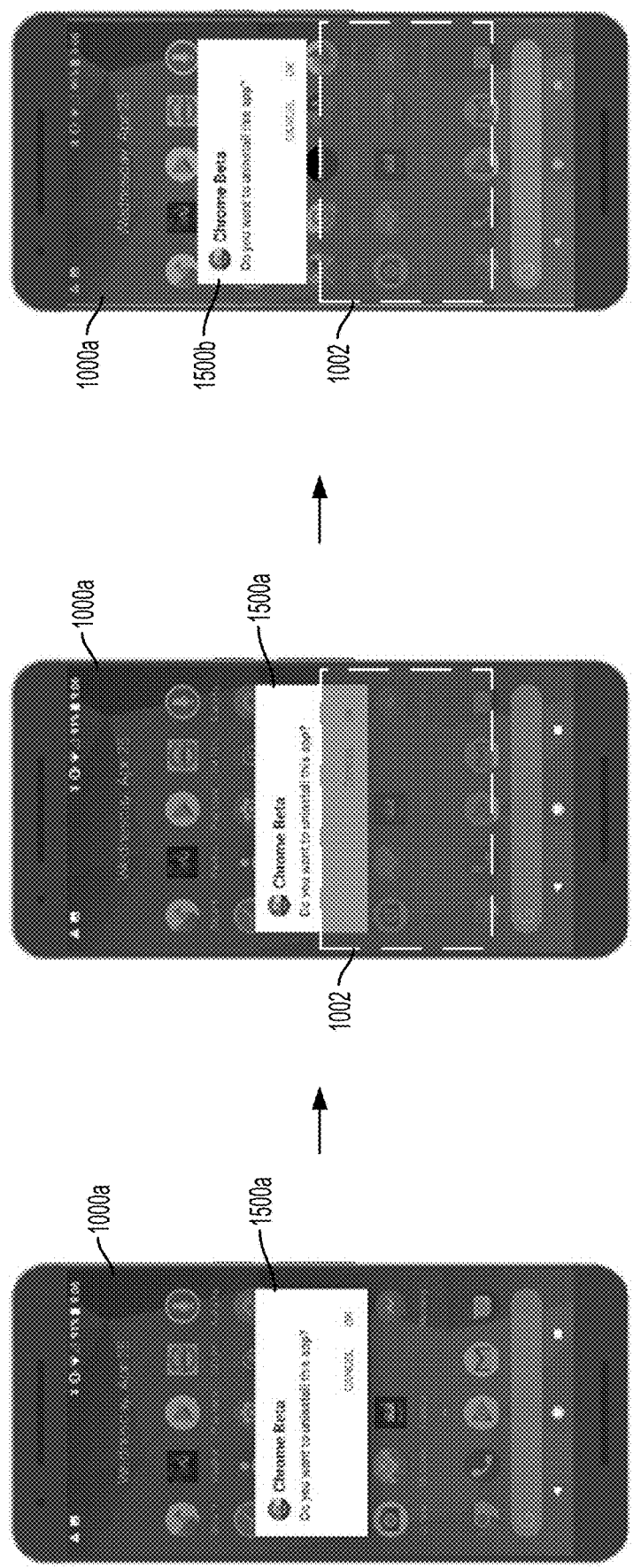
FIG. 15 is a UI process flow diagram illustrating automatic dialog box placement in a UI for a damaged touch-panel according to various embodiments.

FIG. 15 illustrates automatic UI element placement in a UI for a damaged touch-panel. In the example illustrated in FIG. 15 the UI element 1500a may be a dialog box. A UI 1000a may normally display a UI element 1500a on the touchscreen of the computing device. An event may occur that causes the touch-panel to become damaged, resulting in an unhealthy and/or nonfunctional area of the touch-panel 1002 overlapping an area where the UI element 1500a is normally displayed. For an interactive UI element 1500a, like a dialog box, the unhealthy and/or nonfunctional area of the touch-panel 1002 overlapping an area where the UI element 1500a is normally displayed may prevent the user from properly interacting with the UI element 1500a. The computing device may automatically modify the placement of the UI element 1500a so that the modified UI element 1500b is displayed such that the unhealthy and/or nonfunctional area of the touch-panel 1002 does not overlap the area where the modified UI element 1500b is displayed. The modification to the UI element 1500a may allow the user to properly interact with the modified UI element 1500b.

Figure 16:
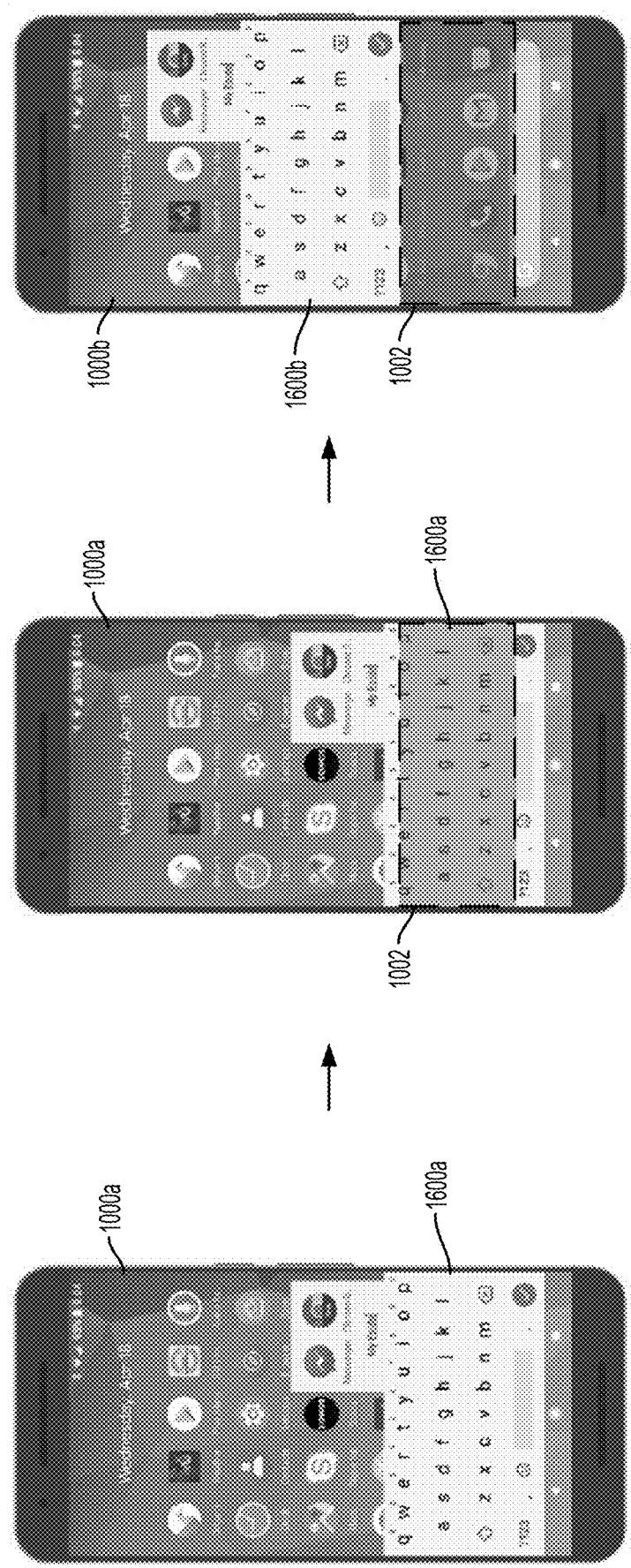
FIG. 16 is a UI process flow diagram illustrating automatic keyboard placement in a UI for a damaged touch-panel according to various embodiments.

FIG. 16 illustrates automatic UI element placement in a UI for a damaged touch-panel. In the example illustrated in FIG. 16 the UI element 1600a may be a keyboard. A UI 1000a may normally display a UI element 1600a on the touchscreen of the computing device. An event may occur that causes the touch-panel to become damaged, resulting in an unhealthy and/or nonfunctional area of the touch-panel 1002 overlapping an area where the UI element 1600a is normally displayed. For an interactive UI element 1600a, like a keyboard, the unhealthy and/or nonfunctional area of the touch-panel 1002 overlapping an area where the UI element 1600a is normally displayed may prevent the user from properly interacting with the UI element 1600a. The computing device may automatically modify the placement of the UI element 1600a so that the modified UI element 1600b is displayed such that the unhealthy and/or nonfunctional area of the touch-panel 1002 does not overlap the area where the modified UI element 1600b is displayed. The modification to the UI element 1600a may allow the user to properly interact with the modified UI element 1600b.

Figure 14:
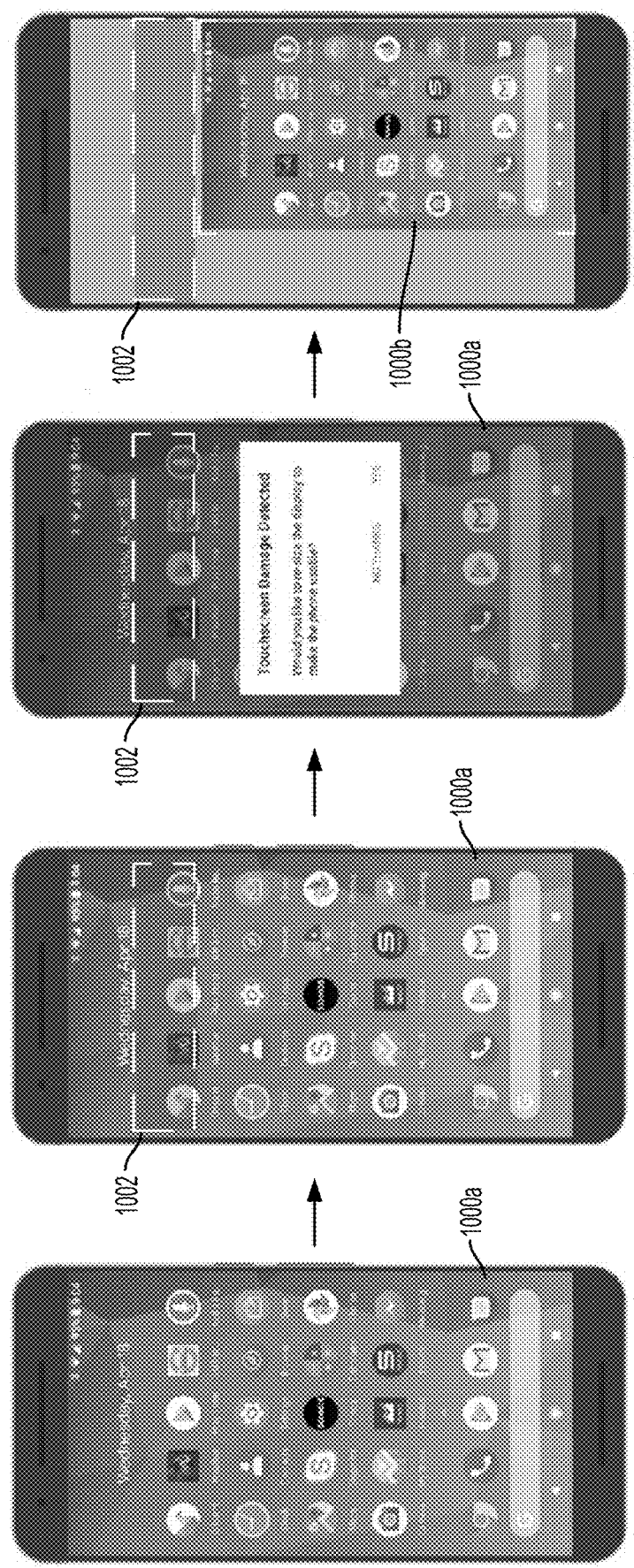
FIG. 14 is a UI process flow diagram illustrating automatic resizing and/or moving of a UI for a damaged touch-panel according to various embodiments.
Figure 17:
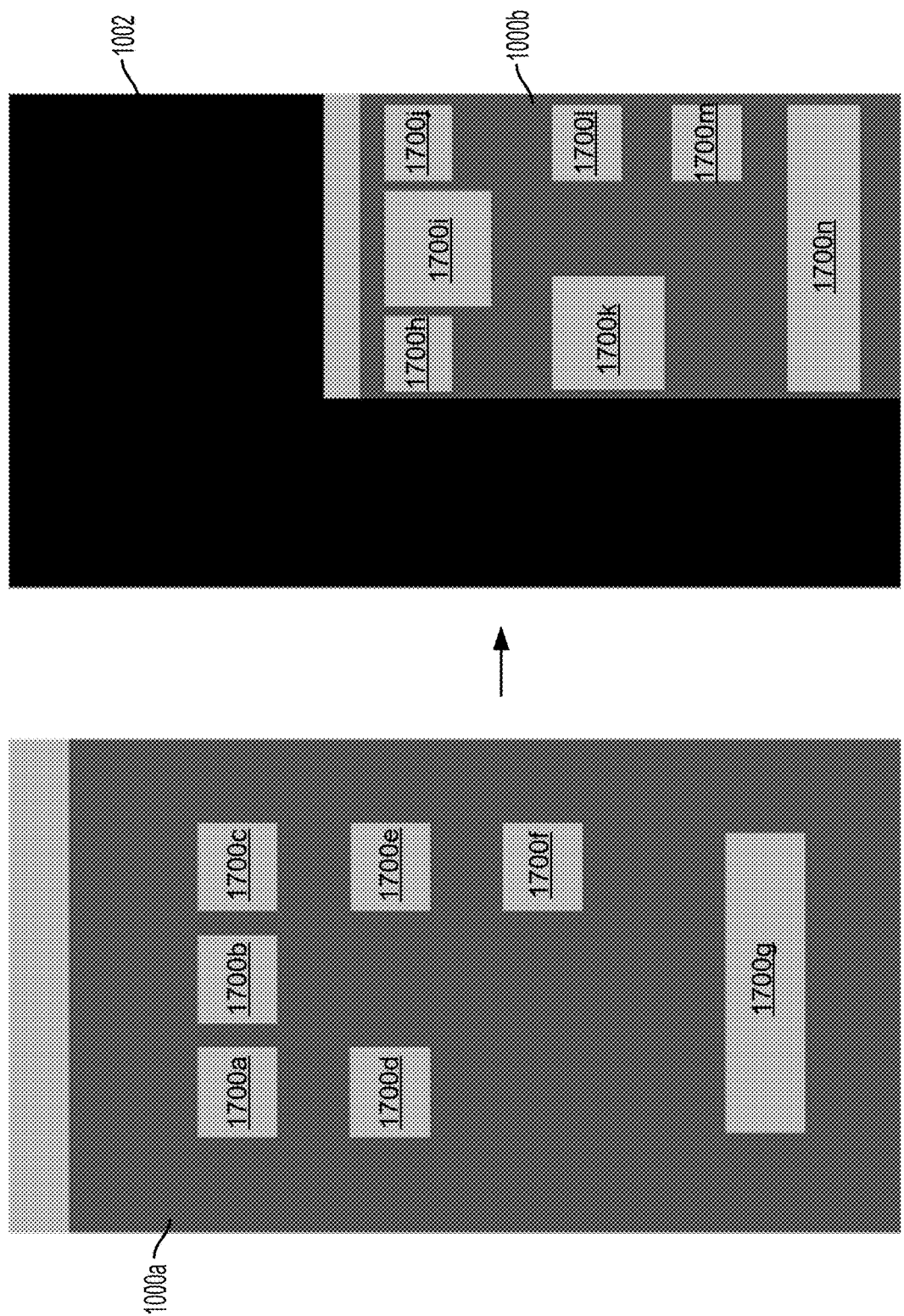
FIG. 17 is a UI process flow diagram illustrating automatic resizing and/or moving of a UI and icons in the UI for a damaged touch-panel according to various embodiments.

FIG. 17 is a UI process flow diagrams illustrating automatic resizing and/or moving of a UI and UI elements in the UI for a damaged touch-panel according to various embodiments. In addition to the example described herein as illustrated in FIG. 14. The UI 1000a may include any number of UI elements 1700a-1700g, such as icons, widgets, search bars, etc. The computing device may prioritize any combination of the UI elements 1700a-1700g based on any combination of factors, such as historical use of a UI element 1700a-1700g over time recorded by the computing device, user, computing device manufacturer, OS and/or application author set UI element priority, etc. Higher prioritized UI elements 1700a-1700g may be modified differently from lower prioritized UI elements 1700a-1700g. Higher prioritized modified UI elements 1700h-1700n may be modified to make it easier for a user of the computing device to interact with the higher prioritized modified UI elements 1700h-1700n than lower prioritized modified UI elements 1700h-1700n. For example higher prioritized UI elements 1700a-1700g may be modified such that higher prioritized modified UI elements 1700h-1700n may be placed in more prominent locations and/or sized larger in the modified UI 1000b than lower prioritized modified UI elements 1700h-1700n. In some embodiments, lower prioritized modified UI elements 1700h-1700n may be grouped into folders, moved to other screens, etc.

Figure 18:
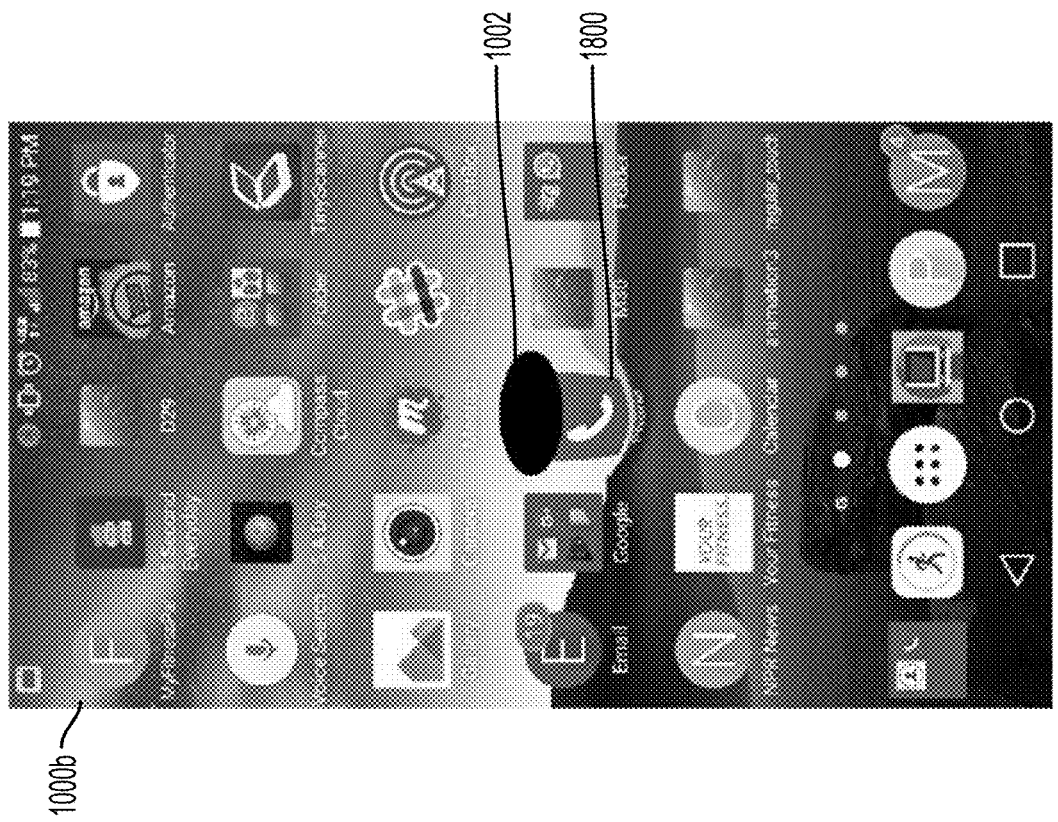
FIG. 18 is a UI diagram illustrating automatic warping of a UI area and icons in the UI for a damaged touch-panel according to various embodiments.

FIG. 18 illustrates automatic warping of a UI area and UI elements in the UI for a damaged touch-panel. In the example illustrated in FIG. 18 the UI element may be an icon. A UI (e.g., UI 1000a in FIGS. 10A and 14-17) may normally display a UI element on the touchscreen of the computing device. An event may occur that causes the touch-panel to become damaged, resulting in an unhealthy and/or nonfunctional area of the touch-panel 1002 overlapping an area where the UI element is normally displayed. For an interactive UI element, like an icon, the unhealthy and/or nonfunctional area of the touch-panel 1002 overlapping an area where the UI element is normally displayed may prevent the user from properly interacting with the UI element. The computing device may automatically modify the UI element by warping the UI element. Warping may involve moving parts of the UI element in the UI to avoid overlapping the UI element with the unhealthy and/or nonfunctional area of the touch-panel 1002. The example in FIG. 18 illustrates a modified UI element 1800 that has been modified by warping the UI element. The modification to the UI element may allow the user to properly interact with the modified UI element 1800. In some embodiments, the unhealthy and/or nonfunctional area of the touch-panel 1002 may be highlighted on the touchscreen for indication of the unhealthy and/or nonfunctional area of the touch-panel 1002 to the user.

Figure 19:
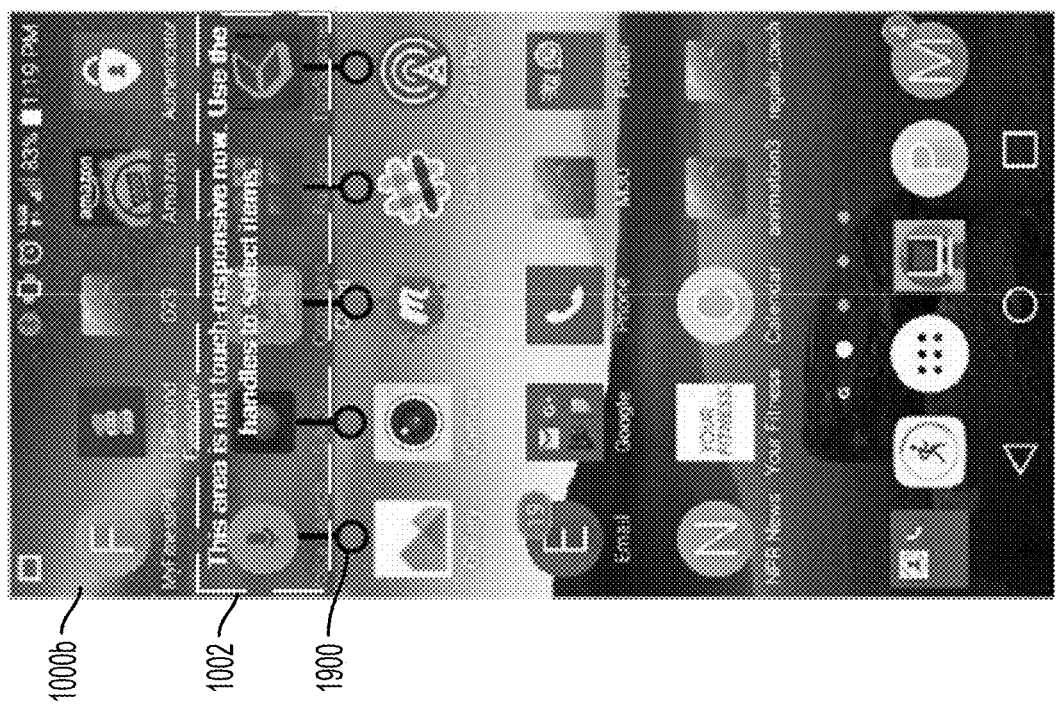
FIG. 19 is a UI diagram illustrating handles for icons in a UI for a damaged touch-panel according to various embodiments.

FIG. 19 illustrates handles for UI elements in a UI for a damaged touch-panel. In the example illustrated in FIG. 19 the UI element may be an icon. A UI (e.g., UI 1000a in FIGS. 10A and 14-17) may normally display a UI element on the touchscreen of the computing device. An event may occur that causes the touch-panel to become damaged, resulting in an unhealthy and/or nonfunctional area of the touch-panel 1002 overlapping an area where the UI element is normally displayed. For an interactive UI element, like an icon, the unhealthy and/or nonfunctional area of the touch-panel 1002 overlapping an area where the UI element is normally displayed may prevent the user from properly interacting with the UI element. The computing device may automatically modify the UI to remap a location for interacting with the UI element to outside of the unhealthy and/or nonfunctional area of the touch-panel 1002. The computing device may provide the user with a visual indication 1900, such as a handle, in the modified UI 1000b to the remapped location for interacting with the UI element. The modification to the UI element may allow the user to properly interact with the UI element in the modified UI 1000b via interaction with the visual indication 1900. For example, the user may interact with the visual indication 1900 to drag the UI element to an area of the modified UI 1000b other than the unhealthy and/or nonfunctional area of the touch-panel 1002. The user may interact with the visual indication 1900 to cause the UI element to respond in a manner consistent with the user interaction. For example, a user interaction with the visual indicator 1900 consistent with selection of an icon may cause an application related to the icon to launch. In some embodiments, the unhealthy and/or nonfunctional area of the touch-panel 1002 may be highlighted on the touchscreen for indication of the unhealthy and/or nonfunctional area of the touch-panel 1002 to the user.

Figure 20:
FIG. 20 is a UI diagram illustrating mouse control in a UI for a damaged touch-panel according to various embodiments.

FIG. 20 illustrates a mouse control in a UI for a damaged touch-panel. In the example illustrated in FIG. 20 the UI element may be an icon. A UI (e.g., UI 1000a in FIGS. 10A and 14-17) may normally display a UI element on the touchscreen of the computing device. An event may occur that causes the touch-panel to become damaged, resulting in an unhealthy and/or nonfunctional area of the touch-panel 1002 overlapping an area where the UI element is normally displayed. For an interactive UI element, like an icon, the unhealthy and/or nonfunctional area of the touch-panel 1002 overlapping an area where the UI element is normally displayed may prevent the user from properly interacting with the UI element.

The computing device may automatically modify the UI to include a mouse control 2000 and a mouse cursor 2002. In the modified UI 1000b, the mouse control 2000 may be placed in the UI at a location outside of the unhealthy and/or nonfunctional area of the touch-panel 1002 such that the user of the computing device may properly interact with the mouse control 2000.

The user may interact with the mouse control 2000 to control a mouse cursor 2002 to interact with the UI element within the unhealthy and/or nonfunctional area of the touch-panel 1002. For example, the user may interact with the UI element via the mouse control 2000 and the mouse cursor 2002 to drag the UI element to an area of the modified UI 1000b other than the unhealthy and/or nonfunctional area of the touch-panel 1002.

The user may interact with the visual with the UI element via the mouse control 2000 and the mouse cursor 2002 to cause the UI element to respond in a manner consistent with the user interaction. For example, a user interaction with the with the UI element via the mouse control 2000 and the mouse cursor 2002 consistent with selection of an icon may cause an application related to the icon to launch. In some embodiments, the unhealthy and/or nonfunctional area of the touch-panel 1002 may be highlighted on the touchscreen for indication of the unhealthy and/or nonfunctional area of the touch-panel 1002 to the user.

Figure 21:
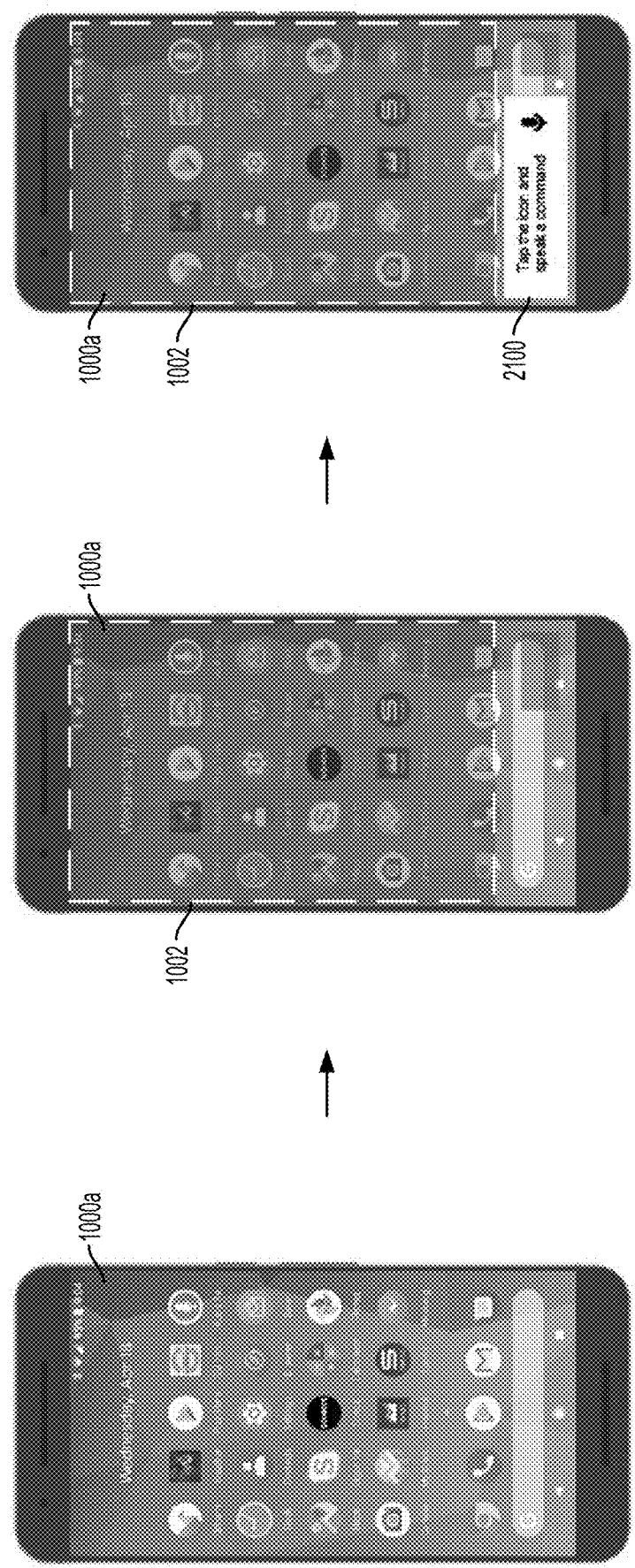
FIG. 21 is a UI process flow diagram illustrating voice only control of a UI for a damaged touch-panel according to various embodiments.

FIG. 21 illustrates alternative control of a UI for a damaged touch-panel according to various embodiments. A UI 1000a may normally display on the touchscreen of the computing device. An event may occur that causes the touch-panel to become damaged, resulting in an unhealthy and/or nonfunctional area of the touch-panel 1002 that may overlap with a majority or all of the UI 1000a. The unhealthy and/or nonfunctional area of the touch-panel 1002 may be so large that it may prevent the majority user interaction with the UI 1000a via the touchscreen.

In some embodiments, the computing device may notify a user that the unhealthy and/or nonfunctional area of the touch-panel 1002 is detected and remap interaction with the UI 1000a to other input devices (e.g., speaker 110, microphone 112, physical button 124, peripheral device 128 in FIG. 1) of the computing device. The computing device may provide a prompt to the user to activate and/or use another input device to interact with the UI 1000a. For example, the prompt may be a UI element 2100 in an area of the touchscreen outside of the unhealthy and/or nonfunctional area of the touch-panel 1002 that may activate voice control of the UI in response to a user interaction with the UI element 2100.

Figure 22:
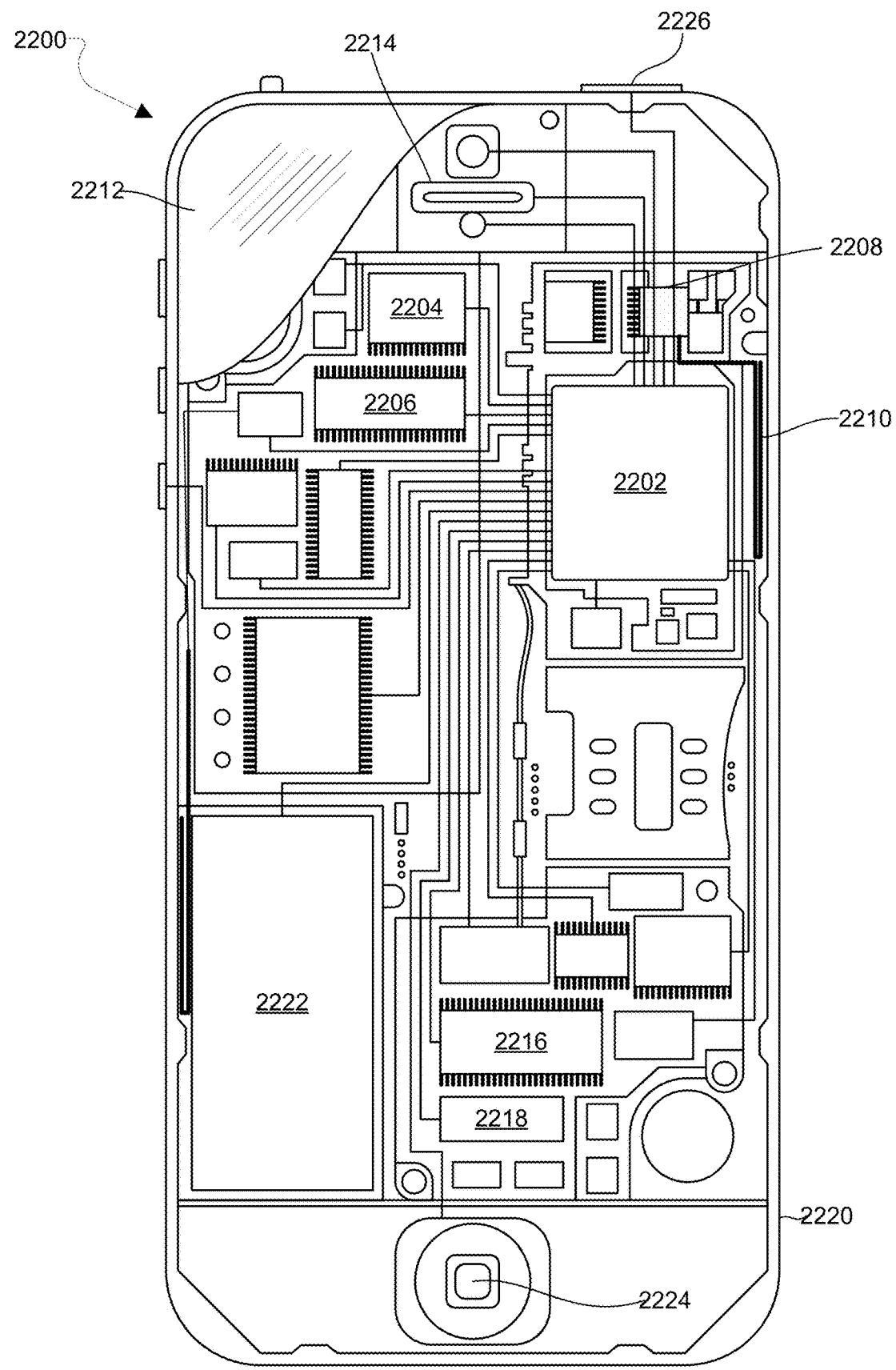
FIG. 22 is a component block diagram illustrating an example wireless communication device suitable for use with the various embodiments.

The various embodiments (including, but not limited to, embodiments described above with reference to FIGS. 1-21) may be implemented in a wide variety of computing systems including wireless communication devices, an example of which suitable for use with the various embodiments is illustrated in FIG. 22. The wireless communication device 2200 may include a processor 2202 coupled to a touchscreen controller 2204 and an internal memory 2206. The processor 2202 may be one or more multicore integrated circuits designated for general or specific processing tasks. The internal memory 2206 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 2204 and the processor 2202 may also be coupled to a touchscreen panel 2212, such as a resistive-sensing touchscreen, capacitive-sensing touchscreen, infrared sensing touchscreen, etc. Additionally, the display of the computing device 2200 need not have touchscreen capability.

The wireless communication device 2200 may have one or more radio signal transceivers 2208 (e.g., Peanut, Bluetooth, ZigBee, Wi-Fi, RF radio) and antennae 2210, for sending and receiving communications, coupled to each other and/or to the processor 2202. The transceivers 2208 and antennae 2210 may be used with the above-mentioned circuitry to implement the various wireless transmission protocol stacks and interfaces. The wireless communication device 2200 may include a cellular network wireless modem chip 2216 that enables communication via a cellular network and is coupled to the processor.

The wireless communication device 2200 may include a peripheral device connection interface 2218 coupled to the processor 2202. The peripheral device connection interface 2218 may be singularly configured to accept one type of connection, or may be configured to accept various types of physical and communication connections, common or proprietary, such as Universal Serial Bus (USB), FireWire, Thunderbolt, or PCIe. The peripheral device connection interface 2218 may also be coupled to a similarly configured peripheral device connection port (not shown).

The wireless communication device 2200 may also include speakers 2214 for providing audio outputs. The wireless communication device 2200 may also include a housing 2220, constructed of a plastic, metal, or a combination of materials, for containing all or some of the components described herein. The wireless communication device 2200 may include a power source 2222 coupled to the processor 2202, such as a disposable or rechargeable battery. The rechargeable battery may also be coupled to the peripheral device connection port to receive a charging current from a source external to the wireless communication device 2200. The wireless communication device 2200 may also include a physical button 2224 for receiving user inputs. The wireless communication device 2200 may also include a power button 2226 for turning the wireless communication device 2200 on and off.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for refining user interface (UI) behavior performed by a processor of a computing device, comprising:
    creating a touch-profile of a touch-panel of the computing device from results of a self-diagnostic test measuring capacitance of capacitive sensors of the touch-panel;
    embedding the touch-profile in a framework of an operating system of the computing device;
    determining a UI modification based on the touch-profile; and
    implementing the UI modification.

2. The method of claim 1, further comprising determining whether the touch-panel is healthy from the touch-profile,
    wherein determining a UI modification based on the touch-profile comprises determining the UI modification based on the touch-profile in response to determining that the touch-panel is not healthy.

3. The method of claim 2, further comprising notifying an operating system or an application executing on the computing device that the touch-panel is not healthy in response to determining that the touch-panel is not healthy,
    wherein determining the UI modification based on the touch-profile comprises determining the UI modification based on the touch-profile for a UI of the operating system by the operating system or for a UI of the application by the application in response to being notified that the touch-panel is not healthy.

4. The method of claim 1, further comprising determining whether the touch-panel is functional from the from the touch-profile,
    wherein determining a UI modification based on the touch-profile comprises determining the UI modification of remapping interaction with the UI to an input device of the computing device other than the touch-panel in response to determining that the touch-panel is not functional.

5. The method of claim 4, further comprising notifying an operating system or an application executing on the computing device that the touch-panel is not functional in response to determining that the touch-panel is not functional,
    wherein determining the UI modification of remapping interaction with the UI to an input device of the computing device other than the touch-panel comprises determining the UI modification of remapping interaction with the UI to the input device of the computing device other than the touch-panel for a UI of the operating system by the operating system or for a UI of the application by the application in response to being notified that the touch-panel is not functional.

6. The method of claim 1, wherein determining a UI modification based on the touch-profile comprises determining the UI modification that maps an area of the UI overlapping with an unhealthy area of the touch-panel to a healthy area of the touch-panel.

7. The method of claim 1, wherein determining a UI modification based on the touch-profile comprises determining the UI modification that maps at least part of an element of the UI overlapping with an unhealthy area of the touch-panel to a healthy area of the touch-panel.

8. The method of claim 1, wherein determining a UI modification based on the touch-profile comprises determining the UI modification that interprets a user interaction with the touch-panel across an unhealthy area of the touch-panel based on a user interaction with the touch-panel outside of the unhealthy area of the touch-panel.

9. A computing device, comprising:
    a touch-panel; and
    a processor coupled to the touch-panel and configured with processor executable instructions to perform operations comprising:
        creating a touch-profile of the touch-panel from results of a self-diagnostic test measuring capacitance of capacitive sensors of the touch-panel;

embedding the touch-profile in a framework of an operating system of the computing device;
determining a user interface (UI) modification based on the touch-profile; and
implementing the UI modification.

10. The computing device of claim 9, wherein the processor is configured with processor-executable instructions to perform operations further comprising determining whether the touch-panel is healthy from the touch-profile,
wherein determining a UI modification based on the touch-profile comprises determining the UI modification based on the touch-profile in response to determining that the touch-panel is not healthy.

11. The computing device of claim 10, wherein the processor is configured with processor-executable instructions to perform operations further comprising notifying an operating system or an application executing on the computing device that the touch-panel is not healthy in response to determining that the touch-panel is not healthy,
wherein determining the UI modification based on the touch-profile comprises determining the UI modification based on the touch-profile for a UI of the operating system by the operating system or for a UI of the application by the application in response to being notified that the touch-panel is not healthy.

12. The computing device of claim 9, wherein the processor is configured with processor-executable instructions to perform operations further comprising determining whether the touch-panel is functional from the from the touch-profile,
wherein determining a UI modification based on the touch-profile comprises determining the UI modification of remapping interaction with the UI to an input device of the computing device other than the touch-panel in response to determining that the touch-panel is not functional.

13. The computing device of claim 12, wherein the processor is configured with processor-executable instructions to perform operations further comprising notifying an operating system or an application executing on the computing device that the touch-panel is not functional in response to determining that the touch-panel is not functional,
wherein determining the UI modification of remapping interaction with the UI to an input device of the computing device other than the touch-panel comprises determining the UI modification of remapping interaction with the UI to the input device of the computing device other than the touch-panel for a UI of the operating system by the operating system or for a UI of the application by the application in response to being notified that the touch-panel is not functional.

14. The computing device of claim 9, wherein the processor is further configured with processor-executable instructions to perform operations such that determining a UI modification based on the touch-profile comprises determining the UI modification that maps an area of the UI overlapping with an unhealthy area of the touch-panel to a healthy area of the touch-panel.

15. The computing device of claim 9, wherein the processor is further configured with processor-executable instructions to perform operations such that determining a UI modification based on the touch-profile comprises determining the UI modification that maps at least part of an element of the UI overlapping with an unhealthy area of the touch-panel to a healthy area of the touch-panel.

16. The computing device of claim 9, wherein the processor is further configured with processor-executable instructions to perform operations such that determining a UI modification based on the touch-profile comprises determining the UI modification that interprets a user interaction with the touch-panel across an unhealthy area of the touch-panel based on a user interaction with the touch-panel outside of the unhealthy area of the touch-panel.

17. A computing device, comprising:
means for creating a touch-profile of a touch-panel of the computing device from results of a self-diagnostic test measuring capacitance of capacitive sensors of the touch-panel;
means for embedding the touch-profile in a framework of an operating system of the computing device;
means for determining a user interface (UI) modification based on the touch-profile; and
means for implementing the UI modification.

18. The computing device of claim 17, further comprising means for determining whether the touch-panel is healthy from the touch-profile,
wherein means for determining a UI modification based on the touch-profile comprises means for determining the UI modification based on the touch-profile in response to determining that the touch-panel is not healthy.

19. The computing device of claim 18, further comprising means for notifying an operating system or an application executing on the computing device that the touch-panel is not healthy in response to determining that the touch-panel is not healthy,
wherein means for determining the UI modification based on the touch-profile comprises means for determining the UI modification based on the touch-profile for a UI of the operating system by the operating system or for a UI of the application by the application in response to being notified that the touch-panel is not healthy.

20. The computing device of claim 17, further comprising means for determining whether the touch-panel is functional from the from the touch-profile,
wherein means for determining a UI modification based on the touch-profile comprises means for determining the UI modification of remapping interaction with the UI to an input device of the computing device other than the touch-panel in response to determining that the touch-panel is not functional.

21. The computing device of claim 20, further comprising means for notifying an operating system or an application executing on the computing device that the touch-panel is not functional in response to determining that the touch-panel is not functional,
wherein means for determining the UI modification of remapping interaction with the UI to an input device of the computing device other than the touch-panel comprises means for determining the UI modification of remapping interaction with the UI to the input device of the computing device other than the touch-panel for a UI of the operating system by the operating system or for a UI of the application by the application in response to being notified that the touch-panel is not functional.

22. The computing device of claim 17, wherein means for determining a UI modification based on the touch-profile comprises means for determining the UI modification that maps an area of the UI overlapping with an unhealthy area of the touch-panel or at least part of an element of the UI overlapping with an unhealthy area of the touch-panel to a healthy area of the touch-panel.

23. The computing device of claim 17, wherein means for determining a UI modification based on the touch-profile comprises means for determining the UI modification that interprets a user interaction with the touch-panel across an unhealthy area of the touch-panel based on a user interaction with the touch-panel outside of the unhealthy area of the touch-panel.

24. A non-transitory processor-readable storage medium having stored thereon processor-executable instructions configured to cause a processor of a computing device to perform operations comprising:
  creating a touch-profile of a touch-panel of the computing device from results of a self-diagnostic test measuring capacitance of capacitive sensors of the touch-panel;
  embedding the touch-profile in a framework of an operating system of the computing device;
  determining a user interface (UI) modification based on the touch-profile; and
  implementing the UI modification.

25. The non-transitory processor-readable storage medium of claim 24, wherein the stored processor-executable instructions are configured to cause the processor of the computing device to perform operations further comprising determining whether the touch-panel is healthy from the touch-profile,
  wherein determining a UI modification based on the touch-profile comprises determining the UI modification based on the touch-profile in response to determining that the touch-panel is not healthy.

26. The non-transitory processor-readable storage medium of claim 25, wherein the stored processor-executable instructions are configured to cause the processor of the computing device to perform operations further comprising notifying an operating system or an application executing on the computing device that the touch-panel is not healthy in response to determining that the touch-panel is not healthy,
  wherein determining the UI modification based on the touch-profile comprises determining the UI modification based on the touch-profile for a UI of the operating system by the operating system or for a UI of the application by the application in response to being notified that the touch-panel is not healthy.

27. The non-transitory processor-readable storage medium of claim 24, wherein the stored processor-executable instructions are configured to cause the processor of the computing device to perform operations further comprising determining whether the touch-panel is functional from the from the touch-profile,
  wherein determining a UI modification based on the touch-profile comprises determining the UI modification of remapping interaction with the UI to an input device of the computing device other than the touch-panel in response to determining that the touch-panel is not functional.

28. The non-transitory processor-readable storage medium of claim 27, wherein the stored processor-executable instructions are configured to cause the processor of the computing device to perform operations further comprising notifying an operating system or an application executing on the computing device that the touch-panel is not functional in response to determining that the touch-panel is not functional,
  wherein determining the UI modification of remapping interaction with the UI to an input device of the computing device other than the touch-panel comprises determining the UI modification of remapping interaction with the UI to the input device of the computing device other than the touch-panel for a UI of the operating system by the operating system or for a UI of the application by the application in response to being notified that the touch-panel is not functional.

29. The non-transitory processor-readable storage medium of claim 24, wherein the stored processor-executable instructions are configured to cause the processor of the computing device to perform operations such that determining a UI modification based on the touch-profile comprises determining the UI modification that maps an area of the UI overlapping with an unhealthy area of the touch-panel or at least part of an element of the UI overlapping with an unhealthy area of the touch-panel to a healthy area of the touch-panel.

30. The non-transitory processor-readable storage medium of claim 24, wherein the stored processor-executable instructions are configured to cause the processor of the computing device to perform operations such that determining a UI modification based on the touch-profile comprises determining the UI modification that interprets a user interaction with the touch-panel across an unhealthy area of the touch-panel based on a user interaction with the touch-panel outside of the unhealthy area of the touch-panel.

* * * * *